(12) United States Patent
Ransom et al.

(10) Patent No.: US 6,988,025 B2
(45) Date of Patent: Jan. 17, 2006

(54) SYSTEM AND METHOD FOR IMPLEMENTING XML ON AN ENERGY MANAGEMENT DEVICE

(75) Inventors: Douglas S. Ransom, Victoria (CA); Andrew W. Blackett, Dartmouth (CA); J. Bradford Forth, Victoria (CA)

(73) Assignee: Power Measurement Ltd., Saanichton (CA)

( * ) Notice: Subject to any disclaimer, the term of this patent is extended or adjusted under 35 U.S.C. 154(b) by 130 days.

(21) Appl. No.: 10/627,244

(22) Filed: Jul. 24, 2003

(65) Prior Publication Data

US 2004/0107025 A1 Jun. 3, 2004

Related U.S. Application Data

(63) Continuation-in-part of application No. 09/814,436, filed on Mar. 22, 2001, now Pat. No. 6,751,562, which is a continuation-in-part of application No. 09/723,564, filed on Nov. 28, 2000.

(51) Int. Cl.
*G06F 17/00* (2006.01)

(52) U.S. Cl. .................. 700/295; 700/22; 700/286; 705/412

(58) Field of Classification Search ............ 700/22, 700/286, 291–295, 297; 705/412
See application file for complete search history.

(56) References Cited

U.S. PATENT DOCUMENTS

| | | | |
|---|---|---|---|
| 4,589,075 A | 5/1986 | Buennagel | 700/286 |
| 4,641,248 A | 2/1987 | Suzuki et al. | 700/292 |
| 5,181,026 A | 1/1993 | Granville | 340/870.28 |
| 5,448,229 A | 9/1995 | Lee, Jr. | 340/870.02 |
| 5,459,459 A | 10/1995 | Lee, Jr. | 340/870.02 |
| 5,477,216 A | 12/1995 | Lee, Jr. et al. | 340/870.02 |
| 5,495,239 A | 2/1996 | Ouellette | 340/870.02 |
| 5,517,423 A | 5/1996 | Pomatto | 700/286 |
| 5,572,438 A | 11/1996 | Ehlers et al. | 700/295 |
| 5,576,700 A | 11/1996 | Davis et al. | 340/3.31 |

(Continued)

OTHER PUBLICATIONS

David Mueller and Sandy Smith, Electrotek Concepts, "Using Web–based Power Quality Monitoring for Problem Solving and Improving Customer Relations", proceedings of the $4^{th}$ Annual Latin American Power 99 Conference, Jun. 29, 1999, pp. 263–271.

(Continued)

*Primary Examiner*—Paul Rodriguez
(74) *Attorney, Agent, or Firm*—Brinks Hofer Gilson & Lione

(57) ABSTRACT

A power management architecture for an electrical power distribution system, or portion thereof, is disclosed. The architecture includes multiple intelligent electronic devices ("IED's") distributed throughout the power distribution system to manage the flow and consumption of power from the system. The IED's are linked via a network to back-end servers. Power management application components operate on the IED's, the back-end servers and inter-operate via the network to implement a power management application. The architecture provides a scalable and cost effective framework of hardware and software upon which such power management applications can operate to manage the distribution and consumption of electrical power by one or more utilities/suppliers and/or customers which provide and utilize the power distribution system. In particular, each IED is capable of incrementally generated or consuming communicated XML documents containing power management data without having to buffer the complete XML document is memory before, during or after processing.

31 Claims, 17 Drawing Sheets

U.S. PATENT DOCUMENTS

| | | | |
|---|---|---|---|
| 5,680,324 A | 10/1997 | Schweitzer, III et al. | 370/241 |
| 5,699,276 A | 12/1997 | Roos | 379/106.03 |
| 5,736,847 A | 4/1998 | Van Doorn et al. | 324/142 |
| 5,764,155 A | 6/1998 | Kertesz et al. | 700/295 |
| 5,862,391 A | 1/1999 | Salas et al. | 713/300 |
| 5,897,607 A | 4/1999 | Jenney et al. | 702/62 |
| 5,956,220 A | 9/1999 | Novosel et al. | 361/62 |
| 6,005,759 A | 12/1999 | Hart et al. | 361/66 |
| 6,035,285 A | 3/2000 | Schlect et al. | 705/30 |
| 6,088,659 A | 7/2000 | Kelley et al. | 702/62 |
| 6,118,269 A | 9/2000 | Davis | 324/110 |
| 6,167,389 A | 12/2000 | Davis et al. | 705/412 |
| 6,169,979 B1 | 1/2001 | Johnson | 705/412 |
| 6,178,362 B1 | 1/2001 | Woolard et al. | 700/295 |
| 6,259,972 B1 | 7/2001 | Sumic et al. | 700/286 |
| 6,285,917 B1 | 9/2001 | Sekiguchi et al. | 700/239 |
| 6,313,752 B1 | 11/2001 | Corrigan et al. | 340/657 |
| 6,327,541 B1 | 12/2001 | Pitchford et al. | 702/62 |
| 6,377,939 B1 * | 4/2002 | Young | 705/34 |
| 6,519,509 B1 * | 2/2003 | Nierlich et al. | 700/286 |
| 6,535,797 B1 | 3/2003 | Bowles et al. | 700/286 |
| 6,549,880 B1 | 4/2003 | Willoughby et al. | 703/13 |
| 6,553,418 B1 | 4/2003 | Collins et al. | 709/224 |
| 6,631,309 B2 * | 10/2003 | Boies et al. | 700/291 |
| 6,681,156 B1 * | 1/2004 | Weiss | 700/291 |
| 6,694,270 B2 | 2/2004 | Hart | 702/57 |
| 2001/0010032 A1 | 7/2001 | Ehlers et al. | 702/62 |
| 2001/0039537 A1 | 11/2001 | Carpenter et al. | 705/400 |
| 2002/0059367 A1 * | 5/2002 | Romero et al. | 709/203 |
| 2002/0077729 A1 | 6/2002 | Anderson | 700/291 |
| 2002/0091784 A1 | 7/2002 | Baker et al. | 709/208 |
| 2002/0103772 A1 * | 8/2002 | Chattopadhyay | 705/412 |
| 2002/0116550 A1 | 8/2002 | Hansen | 709/330 |
| 2002/0120685 A1 | 8/2002 | Srivastava et al. | 709/203 |
| 2002/0161536 A1 | 10/2002 | Suh et al. | 702/62 |
| 2003/0176952 A1 | 9/2003 | Collins et al. | 700/286 |
| 2003/0236903 A1 * | 12/2003 | Piotrowski | 709/231 |

OTHER PUBLICATIONS

Questra Applications Summary Data Sheet, pp. 1–2, Jul. 2, 2002.

Tridium™ Vykon™ Energy "JACE–401™" Product Data Sheet, pp. 1–2, Sep. 16, 2002.

Tridium™ Vykon™ "Vykon Energy Profiler" Product Data Sheet, pp. 1–4, Oct. 16, 2001.

Schneider Electric Square D "Web–Enabled Power Management Solutions" brochure, pp. 1–8, Jan. 2002.

Tridium™ Vykon™ Building "Vykon™ Alarm Service" Product Data Sheet, pp. 1–2, Jun. 20, 2002.

Tridium™ Vykon™ Building "JACE–512™" Product Data Sheet, pp. 1–2, May 15, 2002.

Tridium™ Vykon™ Building "JACE–511™" Product Data Sheet, pp. 1–2, May 28, 2002.

Vykon™ By Tridium "JACE–NP–1®" Product Data Sheet, pp. 1–2, May 28, 2002.

Vykon™ By Tridium "WorkPlace Pro™" Product Data Sheet, pp. 1–2, Jan. 12, 2001.

Vykon™ Building "Web Supervisor™" Product Data Sheet, pp. 1–2, Nov. 30, 2001.

A8800–1 AcquiSuite Data Acquisition System specification, pp. 1–2, Sep. 24, 2001.

LiveData® Real–Time Data Management For Energy and Utility Companies brochure, pp. 1–4, ©copyright 2002, Rev. Jan. 2002.

Tridium™ Vykon™ Energy "With the Right Tools Energy Costs are Controllable . . ." brochure, pp. 1–8, Nov. 1, 2001.

EnergyView™ "Energy Aggregation & Information System (EAIS) for Monitoring and Analysis of Electric and Gas Demand", selected pages from an EnergyView website http://66.64.38.69/energyview, pp. 1–4, Oct. 30, 2001.

Power Monitoring home page, obtained from http://www-.parijat.com/Power_Monitoring.htm, Oct. 9, 2002, one page.

Press Release Aug. 24, 2000 "Connect One Announces Industry's First Wireless Chip to Connect Mobile Devices to the Internet", pp. 1–2.

Press Release, "Connect One and NAMS Create the World's First Dial–up Energy Meter that Sends and Receives E–Mail Without a Gateway", Sep. 5, 2000, pp. 1–2.

NAMS Metals by Nisko, NMM–AKB Specifications page 1 of 1, Sep. 5, 2000.

Connect One "Automatic Meter Reading via the Internet", pp. 1–2. Jul. 11, 2001.

iModem™ "The Fastest Way to Internet–Enable any Device", pp. 1–3. Jul. 11, 2001.

ConnectOne™ Connecting your Device to the Internet™ iChip™ The Internet in your palm™, pp. 1–6, Jul. 11, 2001.

Engage Networks Launches Energy Management Venture, obtained at internet address http://www.engagenet.com/content/business_journal.shtml, Sep. 20, 2000. Appeared in Business Journal Feb. 11, 2000.

Engage Networks Inc. "D–Gen" Distributed Generation Management brochure, pp. 1–4. Link present as of Dec. 2, 1998 according to web archive at http://web.archive.org/web/19981205200934/www.engagenet.com/products.htm.

Engage Networks Inc. "Internet Protocol Card for Revenue Meters" brochure, pp. 1–2. Link present as of Mar. 3, 2000 on http://www.archive.org/web/20010306005433/www.engagenet.com/content/products.shtml. Original document archived at http://web.archive.org/web/20030520161648/http://www.engagenet.com/datasheets/ipcard.pdf on May 20, 2003.

Engage Networks Inc. "AEM" (Active Energy Management) brochure, pp. 1–2. Link present as of Mar. 3, 2000 on http://web.archive.org/web/20010306005433/www.engagenet.com/content/products.shtml. Original document archived at http://web.archive.org/web/20030520161850/http://www.engagenet.com/datasheets/aem.pdf.

David W. Giles, "Direct–Access Metering Via the Web", 1998 CEA Conference, Toronto, Canada, pp. 1–19, © 1998 Power Measurement Ltd. Conference Apr. 27–29, 1998. Presented Apr. 29, 1998.

GE Industrial Systems "EnerVista.com" brochure, Sep. 2000.

Press release, Santa Clara, CA Sep. 25, 2000 "Connect One Reduces Time, Cost and Complexity to Connect Internet Appliances to Ethernet Lans", obtained at internet address http://www.connectone.com/html/prlsep25_2000.htm.

Year 2000 Rediness Disclosure Arcom Control Systems, "Apex", obtained at internet address http://www.arcomcontrols.com/products/pcp/pcp10.htm. Document archived at http://web.archive.org/web/20000530063150/www.arcomcontrols.com/products/pcp/pcp10.htm on May 30, 2000.

Dranetz BMI, Signature System™ "Information, Knowledge, Power" brochure. Applicants believe this reference was published prior to Jan. 9, 2003.

Signature System™ Basics, obtained at internet address http://www.signaturesystem.com/sigbasics.html, Mar. 26, 2001. pp. 1–2.

Signature System™ InfoNodes, obtained at internet address http://www.signaturesystem.com/infonode.html, Mar. 26, 2001. pp. 1–2.

Questra A2B.Platform™ brochure, "Enabling conversation through universal connectivity", pp. 1–4, located at http://www.questra.com/h1_products/Questra_A2Bplatform. Applicants believe this reference was published prior to Jan. 9, 2003.

Questra A2B.Sales™ brochure, "Conversation to help you win", pp. 1–2, located at http://www.questra.com/h1_products/Questra_A2Bsales. Applicants believe this reference was published prior to Jan. 9, 2003.

Power Point Presentation: Presented at "Metering Europe 2000," Sep. 5–7, 2000, source http://www.energyict.com/fh/media/Presentation_Metering 2000Munchen5.zip, pp. 1–37.

Brochure, RTU+Server, source http://www.energyict.com/fh/media/tru_plus_server.pdf, pp. 1–3, Apr. 6, 2001. Document archived at http://www.archive.org/web/20020702060538/http://www.energyict.com/fh/media/rtu_plus_server.pdf Feb. 7, 2001. Link present on http://web.archive.org/web/20010207201520/www.energyict.com/fa/en_ab_frame.htm on or before Feb. 7, 2001.

Brochure, EiServer, The Energy Information server, source http://www.energyict.com/fh/media/EiServer.pdf, pp. 1–7, Jul. 14, 2000. Link present on or before Feb. 7, 2001.

Advertisement, EiServer and RTU+Server, source, Metering International—2001 Issue 1, p. 19, publish date $1^{st}$ Quarter 2001, p. 1.

Article, "Providing Tomorrow's Energy Management and Metering Tools Today," source, Metering International—2001 Issue 1, p. 18, publish date $1^{st}$ Quarter 2001, p. 1.

"Email relating to the general technology of the application received from a competitor", from Erich W. Gunther [mailto:erich@electrotek.com] to Brad_Forth@pml.com sent May 9, 2001 3:36 pm, pp. 1–2.

Electro Industries Press Release "Nexus 1250 High-Performance Power Monitor Gains Ethernet TCP/IP Capabilities," obtained at internet address http://www.electroindustries.com/feb5.html, Feb. 5, 2001, pp. 1–2.

Electro Industries "Nexus 1250 for Industry and Utilities," brochure obtained at internet address http://www.electroindustries.com/pdf/nxsbrochure.pdf pp. 1–14 printed Jun. 1, 2001.

Net Silicon Solutions on Chip "NET+ARM™ Ethernet Processors " brochure, obtained at internet address http://www.netsilicon.com/EmbWeb/products/netarm.asp, pp. 1–2, Copyright© 2001 NetSilicon, Inc. Document archived http://web.archive.org/web/20010719171514/www.netsilicon.com/embweb/products/netarm.asp on Jul. 19, 2001 on Jul 19, 2001.

EmWare® "Solutions Device Link," brochure, obtained at internet address http://www.emware.com/solutions/devicelink/, pp. 1–3, printed Jun. 6, 2001. Document archived http://web.archive.org/web/20010524222001/www.emware.com/solutions/devicelink/ May 24, 2001.

IReady® "Technology iReady's Hardwired TCP/IP Stack," homepage, obtained at internet address http://www.iready.com/, p. 1, ©2000–2001 iReady corporation, printed Jun. 1, 2001. First publishes as early as Mar. 1, 2001. http://web.archive.org/web/20010515202409/http://www.iready.com/link on right side to "technology/index.html" captured Mar. 15, 2001.

muNet News & Events Press Releases "muNet makes cable industry debut with its WebGate™ Internet Residential and Commercial Information Systems, and HomeHeartBeat", http://www.munet.com, pp. 1–2, Dec. 15, 1999.

muNet News & Events Press Releases "muNet's WebGate™ Systems Finds a Home on the Internetl" http://www.munet.com, pp. 1–2, Mar. 18, 1999.

webGate™ IRIS Technology, products brochure pp. 1–9. Applicants believe this reference was published prior to Jan. 9, 2003.

MuNet News & Events Press Release "muNet Demonstrates End-to-Enc IP-Based Energy Management System at DistribuTECH," Feb. 5, 2000, pp 1–2.

WebGate™ IRIS™ "Internet Residential Information System," p. 1 of 1 Published in Energy IT Nov./Dec. 2000 Technology Info Center. See http://www.platts.com/infotech/issues/0011/eittic0011.shtml for this reference—search for munet.com.

WebGate™ ICIS™ "Internet Commercial Information System," p. 1 of 1 Published in Energy IT Nov./Dec. 2000 Technology Info Center. See http://www.platts.com/infotech/issues/0011/eittic0011.shtml for this reference—search for munet.com.

F. Momal, C. Pinto–Pereira, "Using World–Wide–Web for Control Systems" Abstract, AT Division CERN, 1211 Geneva 23, 6 pages. Published 1995.

P. M. Corcoran, J. Desbonnet and K. Lusted THPM 14.2 "CEBus Network Access via the World–Wide–Web" Abstract, ©1996 IEEE, pp. 236 & 237.

ATI Systems, "Technical Overview Ethernet SCAN II™ Module" specification, Oct. 1994, 2 pages.

J. Hofman, "The Consumer Electronic Bus: An Integrated Multi–Media LAN for the Home", International Journal of Digital and Analog Communication Systems, vol. 4, 77–86 (1991), ©1991 by John Wiley & Sons, Ltd.

Lucent Technologies AT&T Forms Expert Team to Design Utility Industry Solutions, press release, Monday, Jan. 23, 1995, pp. 1&2.

Newsbytes Inc., Tampa, FLA, Apr. 13, 1995 pNEW04130013 "TECO & IBM—The "Smart House" Is Here" Press release, obtained at http://filebox.vt.edu/users/mikemike/smart–house/infotrac/article4.txt, Jul. 11, 2002, pp. 1 & 2.

Distributed.Net http://n0cgi.distributed.net/faq/cache/178.html, printed Jun. 10, 2003. Link archived at http://web.archive.org/web/20000901052607/n0cgi.distributed.net/faq/cache/178.html on Sep. 1, 2000.

Questra, Security overview, obtained http://www.questra.com/products/security.asp, printed Jun. 10, 2003. 2 pages. Applicants believe this reference was published prior to Jan. 9, 2003.

Questra Mastering Smart Security brochure, 2 pages Copyright 2002 Questra Corporation, obtained http://www.questra.com/collateral/collateral_files/SecurityOverview.pdf, printed Jun. 10, 2003. Applicants believe this reference was published prior to Jan. 9, 2003.

Questra Total Access brochure, 2 pages, Copyright 2003 Questra Corporation, obtained http://www.questra.com/collateral/collateral_files/TotalAccess.pdf, printed Jun. 10, 2003. Applicants believe this reference was published prior to Jan. 9, 2003.

Axeda DRM System Overview, 2 pages, obtained http://www.axeda.com/solutions/overview.html, printed Jun. 9, 2003. Applicants believe this reference was published prior to Jan. 9, 2003.

Axeda Access, 3 pages, obtained http://www.axeda.com/solutions/portals/portal_access.html, printed Jun. 9, 2003. Applicants believe this reference was published prior to Jan. 9, 2003.

Axeda DRM Technology Overview, 1 page, obtained http://www.axeda.com/solutions/tech_challenges/firewallfriendly.html, printed Jun. 9, 2003. Applicants believe this reference was published prior to Jan. 9, 2003.

Axeda DRM Technology Overview, 1 page, obtained http://www.axeda.com/solutions/tech_challenges/index.html, printed Jun. 9, 2003. Applicants believe this reference was published prior to Jan. 9, 2003.

Axeda DRM Technology Overview, 1 page, obtained http://www.axeda.com/solutions/tech_challenges/standards.html, printed Jun. 9, 2003. Applicants believe this reference was published prior to Jan. 9, 2003.

Axeda Solutions for Industry, 1 page, obtained http://www.axeda.com/solutions/industries/industrial.html, printed Jun. 9, 2003. Archived at http://www.web.archive.org/web/20020221165907/http://axeda.com/industries/industrial.html on Feb. 21, 2002.

Axeda Agents, 2 pages, obtained http://www.axeda.com/solutions/device_servers/index.html, printed Jun. 9, 2003. Applicants believe this reference was published prior to Jan. 9, 2003.

Axeda Case Studies, "Axeda Prevents Power Failures at a Leading Microprocessor Plant in Israel", 2 pages, obtained http://www.axeda.com/industies/casestudies_microprocessor.html, printed Jun. 9, 2003. Applicants believe this reference was published prior to Jan. 9, 2003.

* cited by examiner

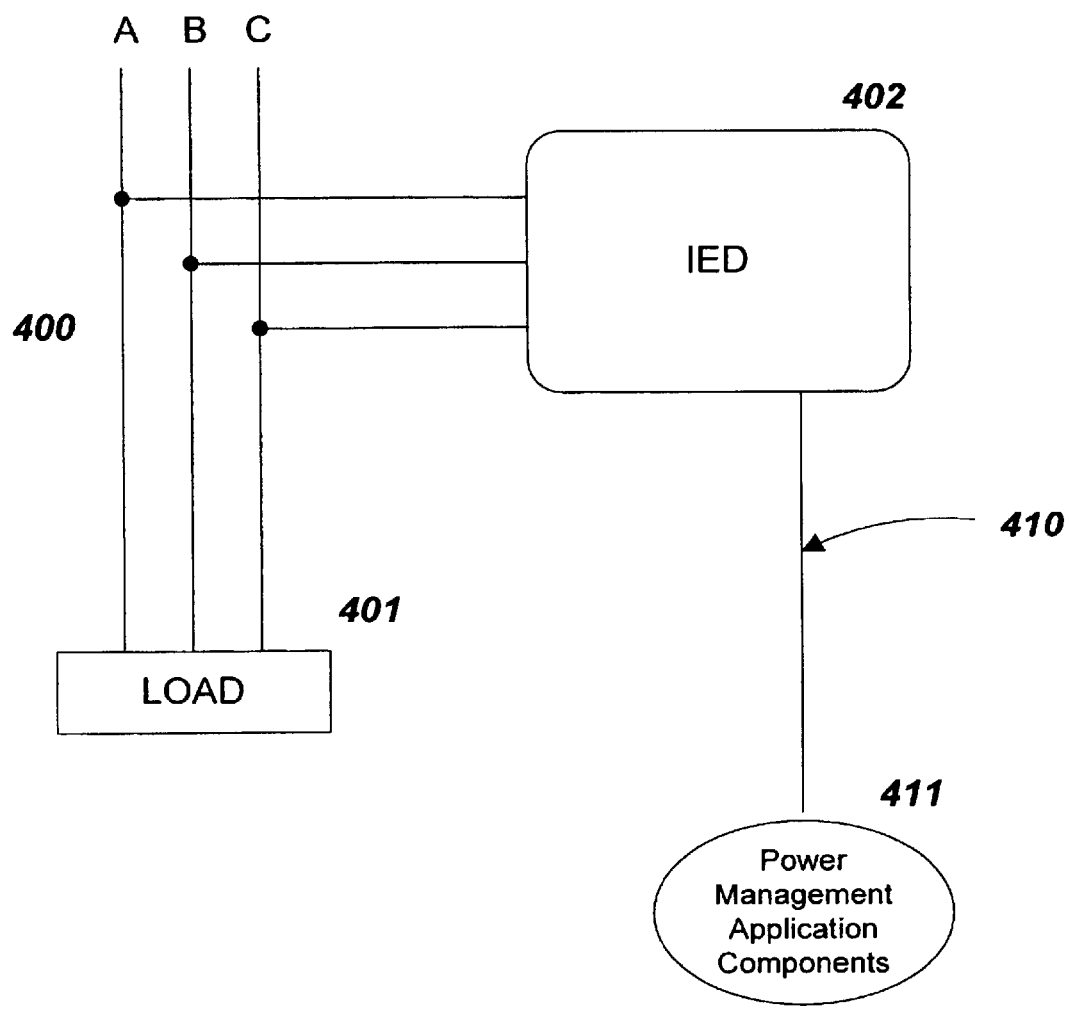

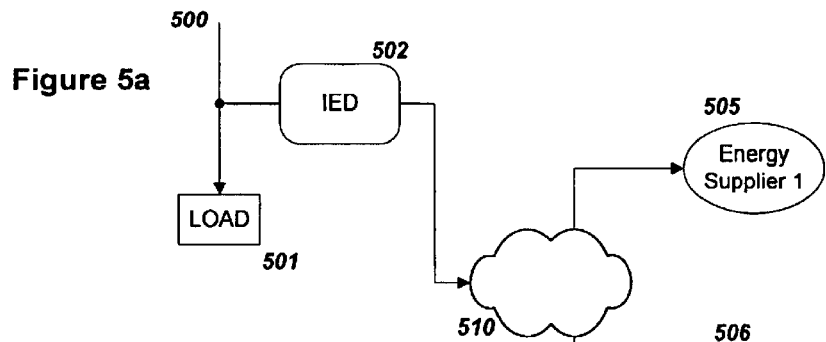
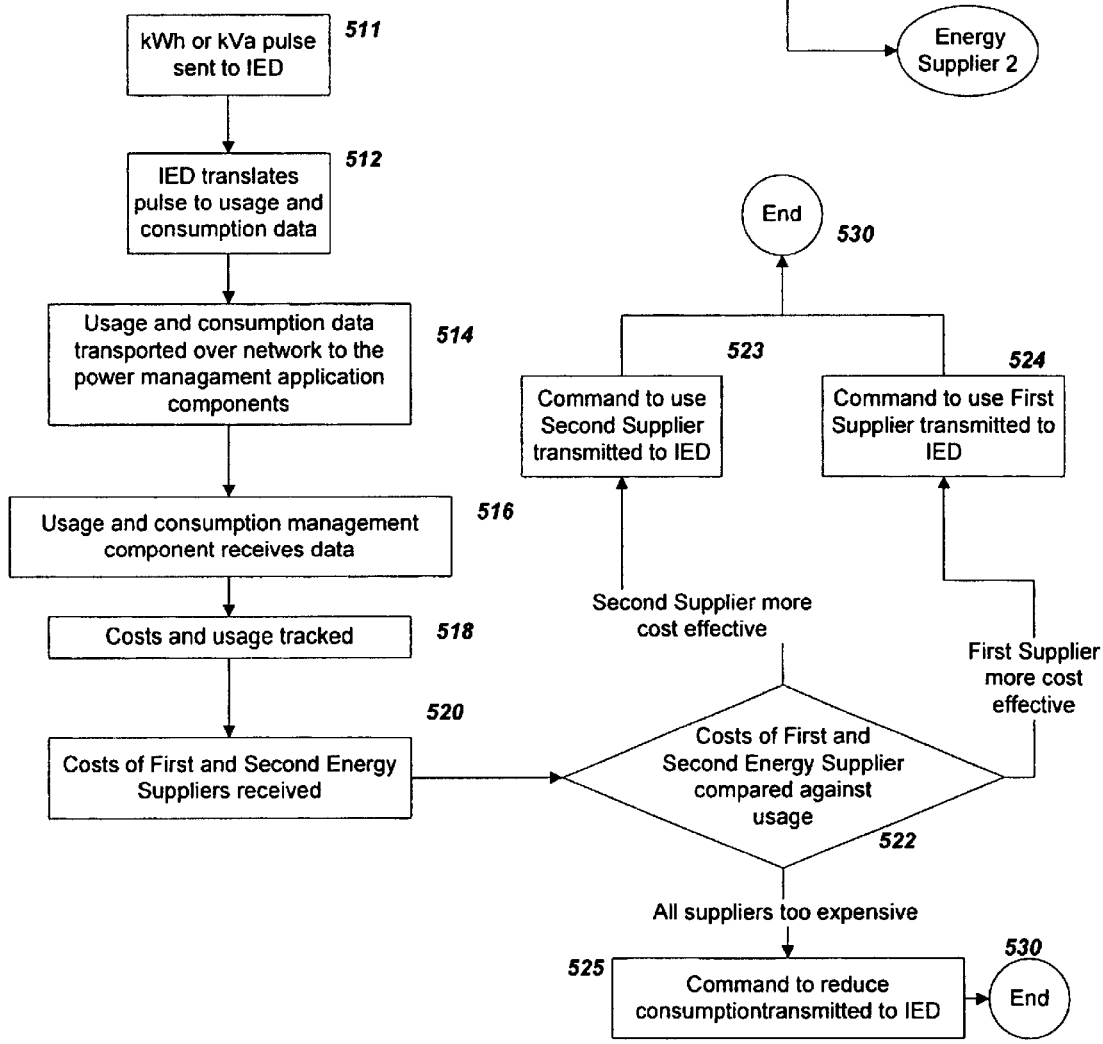

Figure 11

Site1.a8500        Default Diagram

| LABEL | VALUE |
|---|---|
| I a | 197.97 |
| I b | 207.52 |
| I c | 237.82 |
| Vln c | 479.28 |
| Vln b | 371.46 |
| Vll ca | 580.46 |
| Vll ab | 589.1 |
| Vll bc | 586.28 |
| Vll avg | 585.28 |
| Vln avg | 357.23 |
| I avg | 214.44 |
| PF sign tot | -.94 |
| Freq | 59 |
| CL1 LocalTime | 08:32.9 |

```
Change Update Rate
Type in the number of seconds you would
like between page updates and hit <RETURN>    10
```

Some features to implement:
Auto-detection: Excel could automatically add a worksheet (a "tab" below) when it detects a new device on the network
Complex Aggregation: Because it is Excel, you can do anything you want, easily
Logging: You could write simple scripts to log the values on the left to an Access DB
Animation: Charts, warnings, etc.
Onboard logs could be displayed easily
Default diagrams: we just need to create an excel template for each device Sum of Currents:        643.31

Formula-based Setpoint:    OVER 550 Volts

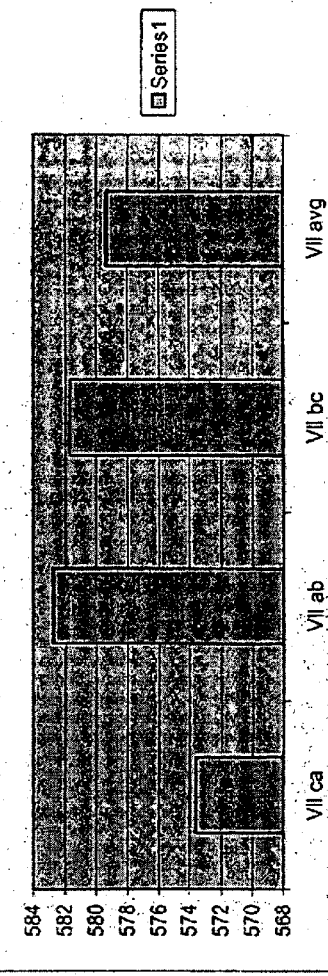

GRAPHICAL VOLTAGES

Figure 15 - generation
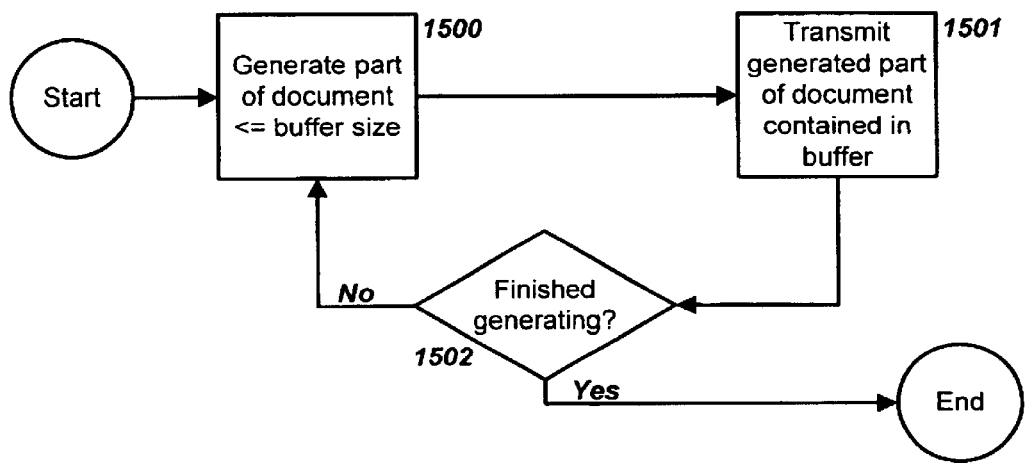
Figure 16 - example of a transformation generation chain
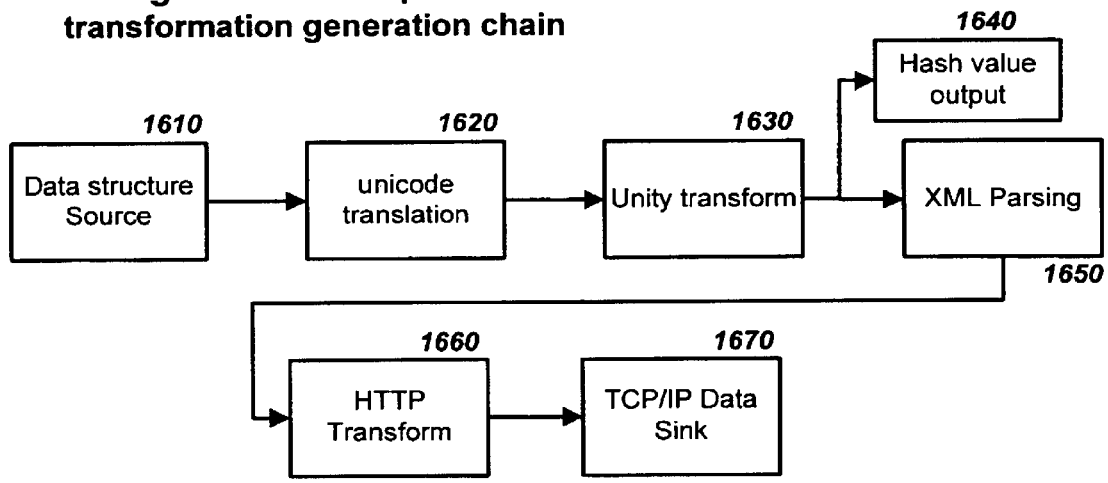

SYSTEM AND METHOD FOR IMPLEMENTING XML ON AN ENERGY MANAGEMENT DEVICE

RELATED APPLICATIONS

This application is a continuation-in-part under 37 C.F.R. § 1.53(b) of U.S. patent application Ser. No. 09/723,564 filed Nov. 28, 2000, the entire disclosure of which is hereby incorporated by reference and U.S. patent application Ser. No. 09/814,436 filed Mar. 22, 2001 now U.S. Pat. No. 6,751,562, the entire disclosure of which is hereby incorporated by reference. U.S. patent application Ser. No. 09/814,436 filed Mar. 22, 2001 now U.S. Pat. No. 6,751,562, is a continuation-in-part under 37 C.F.R § 1.53(b) of U.S. patent application Ser. No. 09/723,564 filed Nov. 28, 2000. U.S. patent application Ser. No. 09/723,564 filed Nov. 28, 2000 is a continuation-in-part under 37 C.F.R. § 1.53(b) of U.S. patent application Ser. No. 08/798,723 filed Feb. 12, 1997, abandoned, the entire disclosure of which is hereby incorporated by reference, which is a continuation-in-part under 37 C.F.R. § 1.53(b) of U.S. patent application Ser. No. 08/369,849 filed Dec. 30, 1994 now U.S. Pat. No. 5,650,936, the entire disclosure of which was incorporated by reference.

BACKGROUND

With the advent of high technology needs and market deregulation, today's energy market has become very dynamic. High technology industries have increased their demands on the electrical power supplier, requiring more power, increased reliability and lower costs. A typical computer data center may use 100 to 300 watts of energy per square foot compared to an average of 15 watts per square foot for a typical commercial building. Further, an electrical outage, whether it is a complete loss of power or simply a drop in the delivered voltage, can cost these companies millions of dollars in down time and lost business.

In addition, deregulation of the energy industry is allowing both industrial and individual consumers the unprecedented capability to choose their supplier which is fostering a competitive supply/demand driven market in what was once a traditionally monopolistic industry.

The requirements of increased demand and higher reliability are burdening an already overtaxed distribution network and forcing utilities to invest in infrastructure improvements at a time when the deregulated competitive market is forcing them to cut costs and lower prices. Accordingly, there is a need for a system of managing the distribution and consumption of electrical power which meets the increased demands of users and allows the utility supplier to compete in a deregulated competitive marketplace.

SUMMARY

The present invention is defined by the following claims, and nothing in this section should be taken as a limitation on those claims. By way of introduction, the preferred embodiments described below relate to an energy management device for managing the flow of energy in an energy distribution system, the energy management device for use in an energy management architecture for managing the energy distribution system, the energy management architecture comprising a network. The energy management device includes: a network interface operative to couple the energy management device with the network; an energy distribution system interface operative to couple the energy management device with the energy distribution system, the energy management device further operative to measure at least one energy management quantity via the energy distribution system interface; a processor coupled with the network interface and the energy distribution system interface and operative to process the at least one energy management quantity to manage the flow of electrical energy; and wherein the network interface is further operative to incrementally receive one of a power management command and power management data encoded as an Extensible Markup Language (XML) document from the network, the XML document being received as a plurality of segments, wherein the network interface is capable of processing at least one received of the plurality of segments and extracting the one of the power management command and power management data therefrom prior to receiving all of the plurality of segments.

In addition, the preferred embodiments described below relate to an energy management device for managing the flow of energy in an energy distribution system, the energy management device for use in an energy management architecture for managing the energy distribution system, the energy management architecture comprising a network. The energy management device includes: a network interface operative to couple the energy management device with the network; an energy distribution system interface operative to couple the energy management device with the energy distribution system, the energy management device further operative to measure at least one energy management quantity via the energy distribution system interface; a processor coupled with the network interface and the energy distribution system interface and operative to process the at least one energy management quantity to manage the flow of energy, and further operative to generate one of a power management command and power management data related thereto; and wherein the network interface is further operative to receive the one of a power management command and power management data from the processor, incrementally generate an XML document comprising the one of a power management command and power management data, the XML document being generated as a plurality of segments, wherein each of the plurality of segments is communicated to the network as it is generated.

The preferred embodiments further relate to a method, in an energy management device, of transmitting a communication from the energy management device over a network coupled with the energy management device. In one embodiment, the method includes: generating a set of data to be communicated over the network as an XML document; transforming each of the data into an XML format as it is generated; and communicating each of the XML formatted data over the network as it is transformed; releasing at least one resource utilized by the XML formatted data from the energy management device as it is communicated; and repeating the transforming and the communicating until the entire the set of data has been communicated.

In addition, the preferred embodiments further relate to a method, in an energy management device, of receiving a communication from a network coupled with the energy management device. In one embodiment, the method includes: receiving data comprising one of a plurality of portions of an XML document from the network; as the data is received, determining when the received one of the plurality of portions comprises processable XML code; and when enough data to process has been received, processing the portion to interpret the processable XML code contained therein; and repeating the receiving, determining and processing until all of the XML document has been received.

Further aspects and advantages of the invention are discussed below in conjunction with the preferred embodiments.

BRIEF DESCRIPTION OF THE DRAWINGS

FIG. 4a illustrates an IED, for use with the embodiment of FIG. 1, coupled with power management components.

FIG. 5a illustrates a preferred embodiment with multiple energy suppliers.

FIG. 5b illustrates a preferred method of managing multiple suppliers for use with the embodiment of FIG. 1.

FIG. 11 illustrates an exemplary display generated by the embodiment of FIG. 10.

FIG. 15 illustrates an exemplary method of incrementally generating and transmitting an XML document according to one embodiment.

FIG. 16 illustrates an exemplary series of transformations to generate an XML document according one embodiment.

DETAILED DESCRIPTION OF THE PRESENTLY PREFERRED EMBODIMENTS

Figure 1:
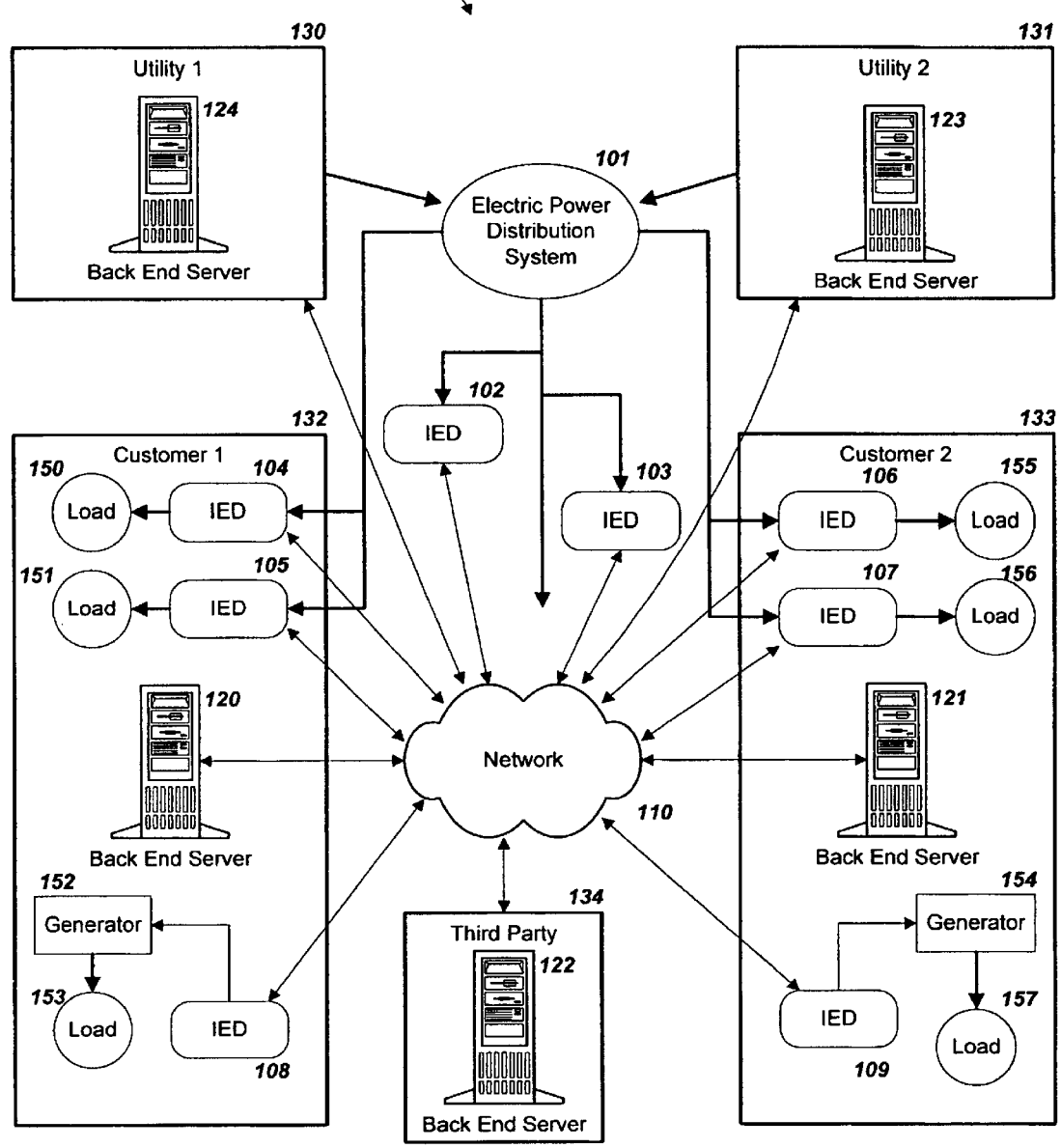
FIG. 1 illustrates a first embodiment of the Power Management Architecture.

Intelligent electronic devices ("IED's") such as programmable logic controllers ("PLC's"), Remote Terminal Units ("RTU's"), electric/watt hour meters, protection relays and fault recorders are widely available that make use of memory and microprocessors to provide increased versatility and additional functionality. Such functionality includes the ability to communicate with remote computing systems, either via a direct connection, e.g. modem or via a network. For more detailed information regarding IED's capable of network communication, please refer to U.S. patent application Ser. No. 08/798,723, captioned above. In particular, the monitoring of electrical power, especially the measuring and calculating of electrical parameters, provides valuable information for power utilities and their customers. Monitoring of electrical power is important to ensure that the electrical power is effectively and efficiently generated, distributed and utilized. Various different arrangements are presently available for monitoring, measuring, and controlling power parameters. Typically, an IED, such as an individual power measuring device, is placed on a given branch or line proximate to one or more loads which are coupled with the branch or line in order to measure/monitor power system parameters. Herein, the phrase "coupled with" is defined to mean directly connected to or indirectly connected with through one or more intermediate components. Such intermediate components may include both hardware and software based components. In addition to monitoring power parameters of a certain load(s), such power monitoring devices have a variety of other applications. For example, power monitoring devices can be used in supervisory control and data acquisition ("SCADA") systems such as the XA/21 Energy Management System manufactured by GE Harris Energy Control Systems located in Melbourne, Fla.

In a typical SCADA application, IED's/power measuring devices individually dial-in to a central SCADA computer system via a modem. However, such dial-in systems are limited by the number of inbound telephone lines to the SCADA computer and the availability of phone service access to the IED/power measuring devices. With a limited number of inbound telephone lines, the number of IED's/power measuring devices that can simultaneously report their data is limited resulting in limited data throughput and delayed reporting. Further, while cellular based modems and cellular system access are widely available, providing a large number of power measuring devices with phone service is cumbersome and often cost prohibitive. The overall result is a system that is not easily scalable to handle a large number of IED's/power measuring devices or the increased bandwidth and throughput requirements of advanced power management applications. However, the ability to use a computer network infrastructure, such as the Internet, allows for the use of power parameter and data transmission and reporting on a large scale. The Internet provides a connectionless point to point communications medium that is capable of supporting substantially simultaneous communications among a large number of devices. For example this existing Internet infrastructure can be used to simultaneously push out billing, load profile, or power quality data to a large number of IED/power measurement and control devices located throughout a power distribution system that can be used by those devices to analyze or make intelligent decisions based on power consumption at their locations. The bandwidth and throughput capabilities of the Internet supports the additional requirements of advanced power management applications. For example, billing data, or other certified revenue data, is typically transferred through a secure process which prevents unauthorized access to the data and ensures receipt of the data by the appropriate device or entity. Utilizing the Internet, communications can be encrypted such as by using encrypted email. Further, encryption authentication parameters such as time/date stamp or the IED serial number, can be employed. Within the Internet, there are many other types of communications applications that may be employed to facilitate the above described inter-device communications such as email, Telnet, file transfer protocol ("FTP"), trivial file transfer protocol ("TFTP") or proprietary systems, both unsecured and secure/encrypted.

As used herein, Intelligent electronic devices ("IED's") include Programmable Logic Controllers ("PLC's"), Remote Terminal Units ("RTU's"), electric power meters, protective relays, fault recorders and other devices which are coupled with power distribution networks to manage and control the distribution and consumption of electrical power. Such devices typically utilize memory and microprocessors executing software to implement the desired power management function. IED's include on-site devices coupled with particular loads or portions of an electrical distribution system and are used to monitor and manage power generation, distribution and consumption. IED's are also referred herein as power management devices ("PMD's").

A Remote Terminal Unit ("RTU") is a field device installed on an electrical power distribution system at the desired point of metering. It is equipped with input channels (for sensing or metering), output channels (for control, indication or alarms) and a communications port. Metered information is typically available through a communication protocol via a serial communication port. An exemplary RTU is the XP Series, manufactured by Quindar Productions Ltd. in Mississauga, Ontario, Canada.

A Programmable Logic Controller ("PLC") is a solid-state control system that has a user-programmable memory for storage of instructions to implement specific functions such as Input/output (I/O) control, logic, timing, counting, report generation, communication, arithmetic, and data file manipulation. A PLC consists of a central processor, input\output interface, and memory. A PLC is designed as an industrial control system. An exemplary PLC is the SLC 500 Series, manufactured by Allen-Bradley in Milwaukee, Wis.

A meter, is a device that records and measures power events, power quality, current, voltage waveforms, harmonics, transients and other power disturbances. Revenue accurate meters ("revenue meter") relate to revenue accuracy electrical power metering devices with the ability to detect, monitor, report, quantify and communicate power quality information about the power which they are metering. An exemplary meter is the model 8500 meter, manufactured by Power Measurement Ltd, in Saanichton, B.C. Canada.

A protective relay is an electrical device that is designed to interpret input conditions in a prescribed manner, and after specified conditions are met, to cause contact operation or similar abrupt change in associated electric circuits. A relay may consist of several relay units, each responsive to a specified input, with the combination of units providing the desired overall performance characteristics of the relay. Inputs are usually electric but may be mechanical, thermal or other quantity, or a combination thereof. An exemplary relay is the type N and KC, manufactured by ABB in Raleigh, N.C.

A fault recorder is a device that records the waveform and digital inputs, such as breaker status which resulting from a fault in a line, such as a fault caused by a break in the line. An exemplary fault recorder is the IDM, manufactured by Hathaway Corp in Littleton, Colo.

IED's can also be created from existing electromechanical meters or solid-state devices by the addition of a monitoring and control device which converts the mechanical rotation of the rotary counter into electrical pulses or monitors the pulse output of the meter. An exemplary electromechanical meter is the AB1 Meter manufactured by ABB in Raleigh, N.C. Such conversion devices are known in the art.

A communications architecture is described that can be used for monitoring, protection and control of devices and electrical power distribution in an electrical power distribution system, where IED's can interact with other IED's and attached devices.

As will be described in more detail below, a power management architecture for an electrical power distribution system, or portion thereof, is disclosed. The architecture provides a scalable and cost effective framework of hardware and software upon which power management applications can operate to manage the distribution and consumption of electrical power by one or more utilities/suppliers and/or customers which provide and utilize the power distribution system.

Power management applications include automated meter reading applications, load shedding applications, deregulated supplier management applications, on-site power generation management applications, power quality management applications, protection/safety applications, and general distribution system management applications, such as equipment inventory and maintenance applications. A power management application typically includes one or more application components which utilize the power management architecture to interoperate and communicate thereby implementing the power management application.

The architecture includes Intelligent Electronic Devices ("IED's") distributed throughout the power distribution system to monitor and control the flow of electrical power. IED's may be positioned along the supplier's distribution path or within a customer's internal distribution system. IED's include revenue electric watt-hour meters, protection relays, programmable logic controllers, remote terminal units, fault recorders and other devices used to monitor and/or control electrical power distribution and consumption. As was noted, IED's also include legacy mechanical or electromechanical devices which have been retrofitted with appropriate hardware and/or software so as to be able to integrate with the power management architecture. Typically an IED is associated with a particular load or set of loads which are drawing electrical power from the power distribution system. As was described above, the IED may also be capable of receiving data from or controlling its associated load. Depending on the type of IED and the type of load it may be associated with, the IED implements a power management function such as measuring power consumption, controlling power distribution such as a relay function, monitoring power quality, measuring power parameters such as phasor components, voltage or current, controlling power generation facilities, or combinations thereof. For functions which produce data or other results, the IED can push the data onto the network to another IED or back end server, automatically or event driven, (discussed in more detail below) or the IED can wait for a polling communication which requests that the data be transmitted to the requestor.

In addition, the IED is also capable of implementing an application component of a power management application utilizing the architecture. As was described above and further described below, the power management application includes power management application components which are implemented on different portions of the power management architecture and communicate with one another via the architecture network. The operation of the power management application components and their interactions/communications implement the power management application. One or more power management applications may be utilizing the architecture at any given time and therefore, the IED may implement one or more power management application components at any given time.

The architecture further includes a communications network. Preferably, the communication network is a publicly accessible data network such as the Internet or other network or combination of sub-networks that transmit data utilizing the transport control protocol/internet protocol ("TCP/IP") protocol suite. Such networks include private intranet networks, virtual private networks, extranets or combinations thereof and combinations which include the Internet. Alternatively, other communications network architectures may also be used. Each IED preferably includes the software and/or hardware necessary to facilitate communications over the communications network by the hardware and/or software which implements the power management functions and power management application components. In alternative embodiments, quality of service protocols can be implemented to guarantee timely data delivery, especially in real time applications.

The hardware and/or software which facilitate network communications preferably includes a communications protocol stack which provides a standard interface to which the power management functions hardware/software and power management application components hardware/software interact. As will be discussed in more detail below, in one embodiment, the communications protocol stack is a layered architecture of software components. In the preferred embodiments these layers or software components include an applications layer, a transport layer, a routing layer, a switching layer and an interface layer.

The applications layer includes the software which implements the power management functions and the power management applications components. Further, the applications layer also includes the communication software applications which support the available methods of network communications. Typically, the power management function software interacts with the power management hardware to monitor and or control the portion of the power distribution system and/or the load coupled with the IED. The application component typically interacts with the power management function software to control the power management function or process data monitored by the power management function. One or both of the power management function software and the power management application component software interacts with the communication software applications in order to communicate over the network with other devices.

The communications applications include electronic mail client applications such as applications which support Simple Mail Transfer Protocol ("SMTP"), Multipurpose Internet Mail Extensions ("MIME") or Post Office Protocol ("POP") network communications protocols, security client applications such as encryption/decryption or authentication applications such as secure-HTTP or secure sockets layer ("SSL"), or other clients which support standard network communications protocols such as telnet, hypertext transport protocol ("HTTP"), file transfer protocol ("FTP"), network news transfer protocol ("NNTP"), instant messaging client applications, or combinations thereof. Other client application protocols include extensible markup language ("XML") client protocol and associated protocols such as Simple Object Access Protocol ("SOAP"). Further, the communications applications could also include client applications which support peer to peer communications. All of the communications applications preferably include the ability to communicate via the security client applications to secure the communications transmitted via the network from unauthorized access and to ensure that received communications are authentic, uncompromised and received by the intended recipient. Further, the communications applications include the ability to for redundant operation through the use of one or more interface layer components (discussed in more detail below), error detection and correction and the ability to communicate through firewalls or similar private network protection devices.

The transport layer interfaces the applications layer to the routing layer and accepts communications from the applications layer that are to be transmitted over the network. The transport layer breaks up the communications layer into one or more packets, augments each packet with sequencing data and addressing data and hands each packet to the routing layer. Similarly, packets which are received from the network are reassembled by the transport layer and the re-constructed communications are then handed up to the applications layer and the appropriate communications applications client. The transport layer also ensures that all packets which make up a given transmission are sent or received by the intended destination. Missing or damaged packets are re-requested by the transport layer from the source of the communication. In the preferred embodiment, the transport layer implements the transport control protocol ("TCP").

The routing layer interfaces the transport layer to the switching layer. The routing layer routes each packet received from the transport layer over the network. The routing layer augments each packet with the source and destination address information. In the preferred embodiment, the routing layer implements the internet protocol ("IP"). It will be appreciated that the TCP/IP protocols implement a connectionless packet switching network which facilitates scalable substantially simultaneous communications among multiple devices.

The switching layer interfaces the routing layer to the interface layer. The switching layer and interface layer are typically integrated. The interface layer comprises the actual hardware interface to the network. The interface layer may include an Ethernet interface, a modem, such as wired modem using the serial line interface protocol ("SLIP") or point to point protocol ("PPP"), wired modem which may be an analog or digital modem such as a integrated services digital network ("ISDN") modem or digital subscriber line ("DSL") modem, or a cellular modem. Further, other wireless interfaces, such as Bluetooth, may also be used. In addition, AC power line data network interface may also be used. Cellular modems further provide the functionality to determine the geographic location of the IED using cellular RF triangulation. Such location information can be transmitted along with other power management data as one factor used in authenticating the transmitted data. In the preferred embodiments, the interface layer provided allows for redundant communication capabilities. The interface layer couples the IED with a local area network, such as provided at the customer or utility site. Alternatively, the interface layer can couple the IED with a point of presence provided by a local network provider such as an internet service provider ("ISP").

Finally, the architecture includes back-end server computers or data collection devices. Back end servers may be provided by the consumer of electric power, the utility supplier of electric power or a third party. In one embodiment, these devices are IED's themselves. The back end servers are also coupled with the network in a same way as the IED's and may also include a communication protocol stack. The back end servers also implement power management applications components which interact and communicate with the power management application components on the IED's to accomplish the power management application. Preferably, the IED's are programmed with the network addresses of the appropriate back end servers or are capable of probing the network for back end servers to communicate with. Similarly, the back end server is programmed with the network addresses of one or more affiliate IED's or is capable of probing the network to find IED's that are connected. In either case of network probing by the IED or back-end server, software and/or hardware is provided to ensure that back-end servers communicate with authorized IED's and vice versa allowing multiple customers and multiple suppliers to utilize the architecture for various power management applications without interfering with each other.

The back end servers preferably are executing software application counterparts to the application clients and protocols operating on the IED's such as electronic mail, HTTP, FTP, telnet, NNTP or XML servers which are designed to receive and process communications from the IED's. Exemplary server communications applications include Microsoft Exchange™. The back end server is therefore capable of communicating, substantially simultaneously, with multiple IED's at any given time. Further, the back end server implements a security application which decrypts and/or authenticates communications received from IED's and encrypts communications sent to IED's.

In one embodiment, software executing on the back end server receives communications from an IED and automatically extracts the data from the communication. The data is automatically fed to a power management application component, such as a billing management component.

In this way, a generally accessible connectionless/scalable communications architecture is provided for operating power management applications. The architecture facilitates IED-supplier communications applications such as for automated meter reading, revenue collection, IED tampering and fraud detection, power quality monitoring, load or generation control, tariff updating or power reliability monitoring. The architecture also supports IED-consumer applications such as usage/cost monitoring, IED tampering and fraud detection, power quality monitoring, power reliability monitoring or control applications such as load shedding/cost control or generation control. In addition, real time deregulated utility/supplier switching applications which respond in real time to energy costs fluctuations can be implemented which automatically switch suppliers based on real time cost. Further the architecture supports communications between IED's such as early warning systems which warn downstream IED's of impending power quality events. The architecture also supports utility/supplier to customer applications such as real time pricing reporting, billing reporting, power quality or power reliability reporting. Customer to customer applications may also be supported wherein customers can share power quality or power reliability data.

As used herein, an IED or PMD is a power management device capable of network communication. A back end server is a data collection or central command device coupled with the network which receives power management data from an IED and/or generates power management commands to and IED. An IED may contain a back-end server. The network is any communications network which supports the Transport Control Protocol/internet Protocol ("TCP/IP") network protocol suite. In the preferred embodiment IED's include devices such as PLC's, RTU's, meters, protection relays, fault recorders or modified electromechanical devices and further include any device which is coupled with an electrical power distribution network, or portion thereof, for the purpose of managing or controlling the distribution or consumption of electrical power.

FIG. 1 illustrates an overview of the preferred embodiment of the Power Management Architecture ("architecture") 100, which contains one or more IED's 102, 103, 104, 105, 106, 107, 108, 109. The IED's 102–109 are connected to an electrical power distribution system 101, or portion thereof, to measure, monitor and control quality, distribution and consumption of electric power from the system 101, or portion thereof. The power distribution system is typically owned by either a utility/supplier or consumer of electric power however some components may be owned and/or leased from third parties. The IED's 102–109 are further interconnected with each other and back end servers 121, 122, 123, 124 via a network 110 to implement a Power Management Application ("application") 211 (not shown). In the preferred embodiment, the network 110 is the Internet. Alternatively, the network 110 can be a private or public intranet, an extranet or combinations thereof, or any network utilizing the Transport Control Protocol/Internet Protocol ("TCP/IP") network protocol suite to enable communications, including IP tunneling protocols such as those which allow virtual private networks coupling multiple intranets or extranets together via the Internet. The network 110 may also include portions or sub-networks which use wireless technology to enable communications, such as RF, cellular or Bluetooth technologies. The network 110 preferably supports application protocols such as telnet, FTP, POP3, SMTP, NNTP, MIME, HTTP, SMTP, SNNP, IMAP, proprietary protocols or other network application protocols as are known in the art as well as transport protocols SLIP, PPP, TCP/IP and other transport protocols known in the art.

The Power Management Application 211 utilizes the architecture 100 and comprises power management application components which implement the particular power management functions required by the application 211. The power management application components are located on the IED 102–109 or on the back end server 121–124, or combinations thereof, and can be a client component, a server component or a peer component. Application components communicate with one another over the architecture 100 to implement the power management application 211.

In one preferred embodiment the architecture 100 comprises IED's 102–109 connected via a network 110 and back end servers 120, 121, 122, 123, 124 which further comprise software which utilizes protocol stacks to communicate. IED's 102–109 can be owned and operated by utilities/suppliers 130, 131, consumers 132 133 or third parties 134 or combinations thereof. Back end servers 120 121 122 123 124 can be owned by utilities/suppliers 130, 131, consumers 132, 133, third parties 134 or combinations thereof. For example, an IED 102–109 is operable to communicate directly over the network with the consumer back-end server 120, 121, another IED 102–19 or a utility back end server 123,124. In another example, a utility back end server 123, 124 is operable to connect and communicate directly with customer back end servers 120, 121. Further explanation and examples on the types of data and communication between IED's 102–109 are given in more detail below.

Furthermore, the architecture's 100 devices, such as the back end servers 120–124 or IED's 102–109, can contain an email server and associated communications hardware and software such as encryption and decryption software. Other transfer protocols, such as file transfer protocols (FTP), Simple Object Access Protocol (SOAP), HTTP, XML or other protocols know in the art may also be used in place of electronic mail. Hypertext Transfer Protocol (HTTP) is an application protocol that allows transfer of files to devices connected to the network. FTP is a standard internet protocol that allows exchange of files between devices connected on a network. Extensible markup language (XML) is a file format similar to HTML that allows transfer of data on networks. XML is a flexible, self describing, vendor-neutral way to create common information formats and share both the format and the data over the connection. In the preferred embodiment the data collection server is operable by either the supplier/utility 130, 131 or the customer 132, 133 of the electrical power distribution system 101. SOAP allows a program running one kind of operating system to communicate with the same kind, or another kind of operating system, by using HTTP and XML as mechanisms for the information exchange.

Furthermore, the application 211 includes an authentication and encryption component which encrypts commands transmitted across the network 110, and decrypts power management data received over the network 110. Authentication is also performed for commands or data sent or received over the network 110. Authentication is the process of determining and verifying whether the IED 102–109 transmitting data or receiving commands is the IED 102–109 it declares itself to be and in the preferred embodiment authentication includes parameters such as time/date stamps, digital certificates, physical locating algorithms such as cellular triangulation, serial or tracking ID's, which could include geographic location such as longitude and latitude. Authentication prevents fraudulent substitution of IED 102–109 devices or spoofing of IED 102–109 data generation in an attempt to defraud. Authentication also minimizes data collection and power distribution system 101 control errors by verifying that data is being generated and commands are being received by the appropriate devices. In the preferred embodiment encryption is done utilizing Pretty Good Privacy (PGP). PGP uses a variation of public key system, where each user has a publicly known encryption key and a private key known only to that user. The public key system and infrastructure enables users of unsecured networks, such as the internet, to securely and privately exchange data through the use of public and private cryptographic key pairs.

In the preferred embodiment the architecture is connectionless which allows for substantially simultaneous communications between a substantial number of IED's within the architecture. This form of scalability eclipses the current architectures that utilize point to point connections, such as provided by telephony networks, between devices to enable communications which limit the number of simultaneous communications that may take place.

Figure 2A:
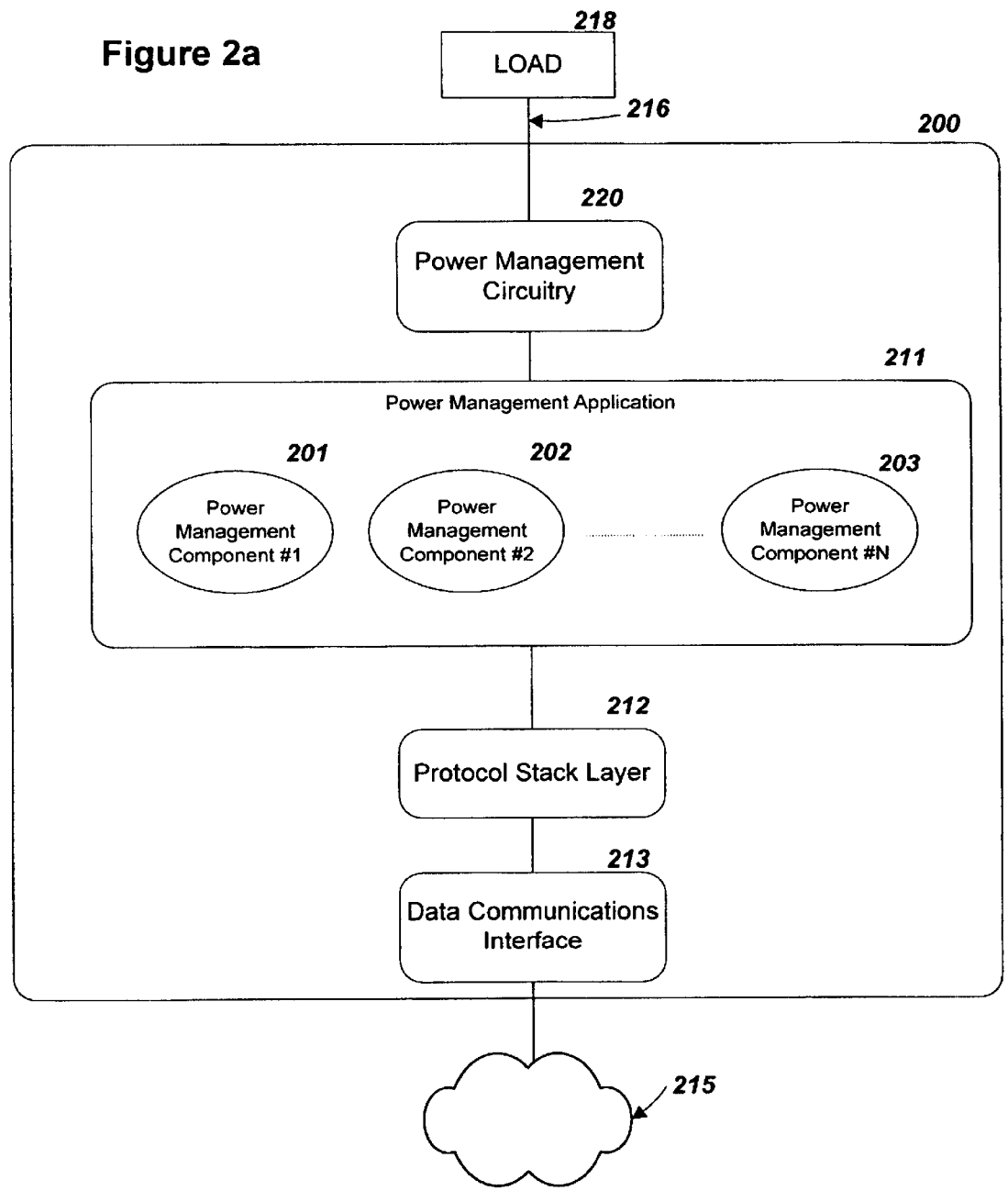
FIG. 2a illustrates an IED, for use with the embodiment of FIG. 1, containing several power management components.

FIG. 2a illustrates a preferred embodiment where and IED 200 contains several power management components 201 202 203 and power management circuitry 220. The power management circuitry 220 is operable to implement the IED's functionality, such as metering/measuring power delivered to the load 218 from the electrical power distribution system 216, measuring and monitoring power quality, implementing a protection relay function, or other functionality of the IED 200. The IED 200 further includes a power management application components 201 202 203 coupled with the circuitry 220 and a protocol stack 212 and data communication interface 213. The protocol stack 212 and data communications interface 213 allow the IED 200 to communicate over the network 215. It will be appreciated that, as described below, the protocol stack 212 may include an interface layer which comprises the data communications interface 213. The power management application components 201 202 203 include software and/or hardware components which, alone, or in combination with other components, implement the power management application 211. The components 201 202 203 may include components which analyze and log the metered/measured data, power quality data or control operation of the IED 200, such as controlling a relay circuit. The components 201 202 203 further include software and/or hardware which processes and communicates data from the IED 200 to other remote devices over the network 215, such as back end servers 121–124 or other IED's 200 (102–109), as will be described below. For example, the IED 200 is connected to a load 218. The power management circuitry 220 includes data logging software applications, memory and a CPU, which are configured to store kWh data from the load 218 in a memory contained within the power management circuitry. The stored data is then read and processed by the components 201 202 in the power management application 211. The components communicate with operating system components which contain the protocol stack 212 and the processed data is passed over the network 215 to the appropriate party via the data communications interface 213. One or more of the components 201 202 203 may communicate with one or more application components located on one or other IED's 200 and/or one or more back end servers 121–124.

Figure 2B:
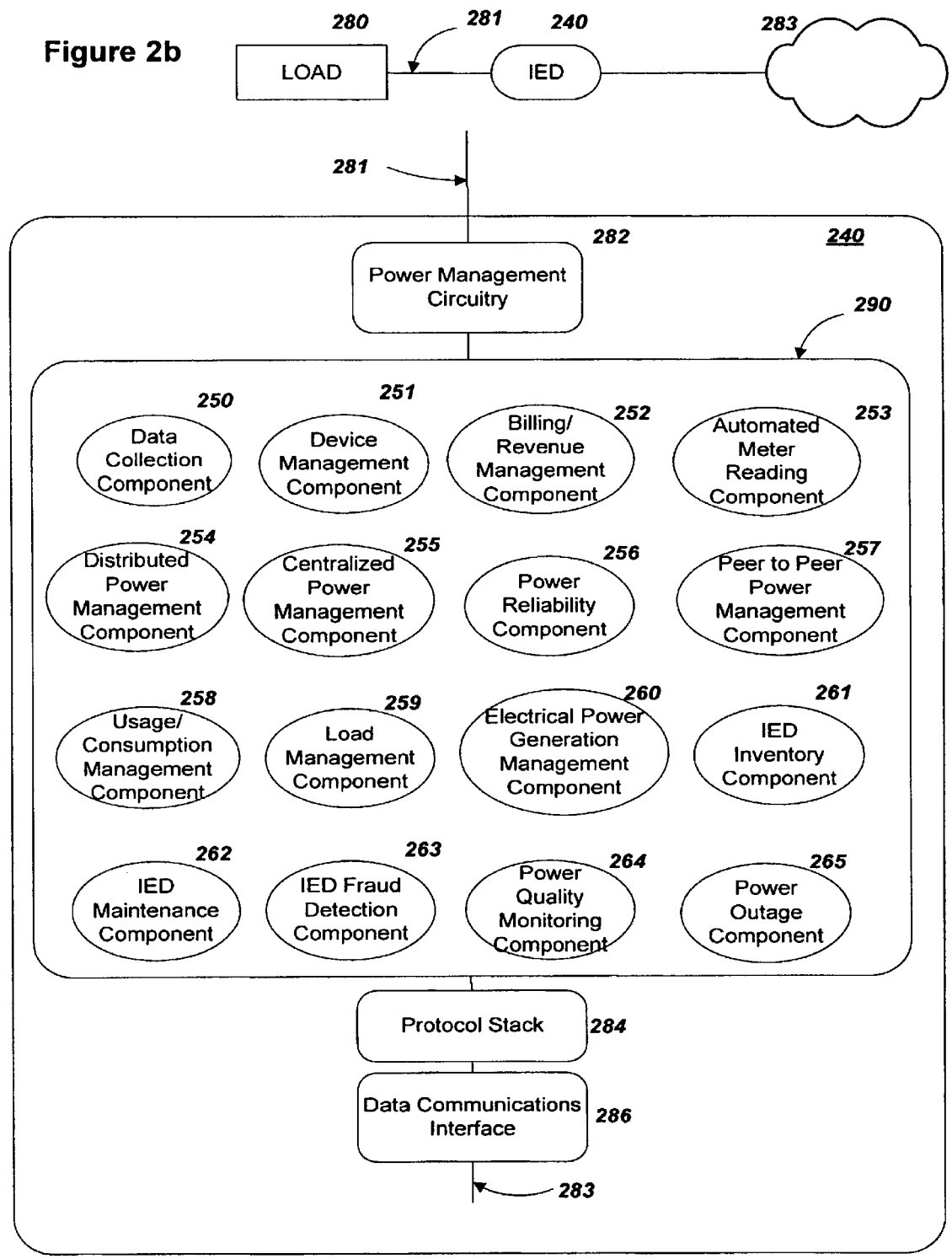
FIG. 2b illustrates another IED, for use with the embodiment of FIG. 1, containing several power management components.

FIG. 2b illustrates an alternate preferred embodiment where an IED 240 is provided which includes power management application components 290. A load 280 is connected to an IED 240 via the electrical power distribution system 281. The IED 240 is further connected to the network 283. The IED 240 contains power management circuitry which is operable to implement the IED's functionality, such as receiving power and generating data from the load 280. The IED further includes a protocol stack layer 284 and a data communication interface 286 which allows the back end server to communicate over the network 283. The power management application components 290 include one or more components such as data collection component 250, an automated meter reading component 253 and a billing/revenue management component 252, which may be revenue certified, a peer-to-peer power management component 257, a usage and consumption management component 258, a distributed power management component 254, a centralized power management component 255, a load management component 259, an electrical power generation management component 260, an IED inventory component 261, an IED maintenance component 262, an IED fraud detection component 263, a power quality monitoring component 264, a power outage component 265, a device management component 251, a power reliability component 256, or combinations thereof. Furthermore, components contained on one IED 240 may operate simultaneously with components on an IED 102–109, 200 or another IED 240 or back end server (not shown). More component details and examples are given below.

In one embodiment the application components comprise software components, such as an email server or an XML or HTTP server. These servers may include a Microsoft Exchange server or a BizTalk framework/XML compatible server. A Microsoft Exchange™ server is an email server computer program manufactured by Microsoft Corporation, located in Redmond, Wash., typically operating on a server computer which facilitates the reception and transmission of emails, and forwards emails to the email client programs, such as Microsoft Outlook™, of users that have accounts on the server. BizTalk is a computer industry initiative which promotes XML as the common data exchange for e-commerce and application integration over the internet. BizTalk provides frameworks and guidelines for how to publish standard data structures in XML and how to use XML messages to integrate software components or programs. Alternately, hardware components, such as a dedicated cellular phone, GPS encryption or decryption key or dongle are included in the components. In a further embodiment, a combination of both hardware and software components are utilized. Additionally, referring back to FIG. 1, one or more power management application components 290 can utilize the architecture 100 to implement their functionality. For example, a utility 130 has a back end server 124 which contains power management application and associated components, such as a usage and consumption monitoring component 258. The utility 130 supplies power to a consumer 132 via the network 110 and monitors the consumers power consumption using the power management application components on the back end server 124 which communicates with the IED's 104, 105, 108 via the network 110 to retrieve measured consumption/usage data. The consumer 132 concurrently monitors usage of loads 150 151 153, where generator 152 supplies power to usage load 153, using an IED 104, 105, 108 which is connected to the network 110, computing real time costs posted by the utility 130. A second customer 133 can also concurrently monitor usage loads 155 156 157 where generator 154 supplies power to usage load 157. In one embodiment, the consumer 132 monitors usage using back end server 120 which receives usage and consumption data from the IED's 104, 105, 108 via the network 110. The IED 104, 105, 108 implements power management application components such as load management components and billing management components. The back end server 120, 124 implements power management application components such as a data collection component, a billing/revenue management component, an automated meter reading component or a usage/consumption management component. The components on the IED 104, 105, 108 work in concert with the components on the back end server 120, 124 via the network 110 to implement the overall power management application. In a further embodiment, one or more power management application components are operating on IED 104, 105, 108 and/or back end servers 120, 124 at any given time. Each power management application can be utilized by one or more users, or different applications can be used by different users. Moreover, the application components can exist on the same or different IED's 104, 105, 108 or back end servers 120, 124.

In the preferred embodiment, the data collection component 250 enables an IED to collect and collate data from either a single or multiple sources via the network 110. The data collected by the component is stored and can be retrieved by other components of the power management application components 290, or other components implemented on other IED's 102–109 located on the network 110. In the preferred embodiment the Automated Meter Reading component 253 is utilized to allow either the consumers 132, 133 or providers 130, 131 to generate power management reports from the IED data. In the preferred embodiment the electrical power generation management component 260 analyzes data received from IED's 102–109 to either minimize or maximize measured or computed values such as revenue, cost, consumption or usage by use of handling and manipulating power systems and load routing. IED inventory, maintenance and fraud detection component 261, 262, 263 receive or request communications from the IED's 102–109 allowing the power management application to inventory the installed base of IED's 102–109, including establishing or confirming their geographic installation location, or check the maintenance history of all connected IED's 102–109 These power management applications aid in confirming outage locations or authenticating communications to or from an IED 102–109 to prevent fraud and minimize errors. In one embodiment, the IED inventory component 261 utilizes cellular triangulation technologies, or caller ID based geographic locator technologies to determine and verify IED inventories. In the preferred embodiment the fraud detection component 263 further detects device tampering. In the preferred embodiment the power quality monitoring component 264 monitors and processes electric parameters, such as current, voltage and energy which include volts, amps, Watts, phase relationships between waveforms, kWh, kvAr, power factor, and frequency, etc. The power quality monitoring component 264 reports alarms, alerts, warnings and general power quality status, based on the monitored parameters, directly to the appropriate user, such as customers 132, 133 or utilities 130, 131.

Figure 3A:
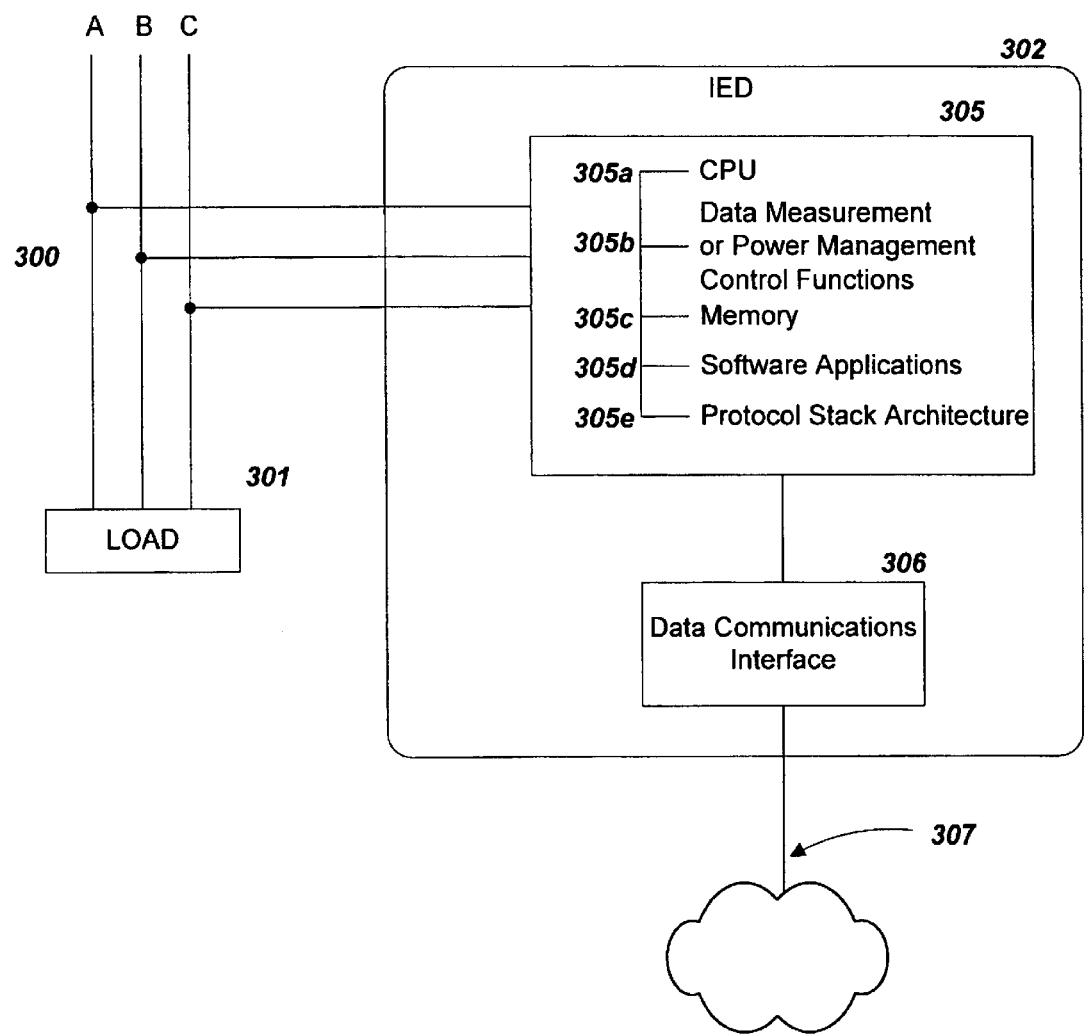
FIG. 3a illustrates an IED, for use with the embodiment of FIG. 1, connected to a power system.

FIG. 3a illustrates a preferred embodiment of an IED 302 for use with the disclosed power management architecture 100. The IED 302 is preferably coupled with a load 301 via a power a distribution system 300, or portion thereof. The IED 302 includes device circuitry 305 and a data communications interface 306. The IED 302 is further coupled with a network 307. The device circuitry 305 includes the internal hardware and software of the device, such as the CPU 305a, memory 305c, firmware and software applications 305d, data measurement functions 305b and communications protocol stack 305e. The data communication interface 306 couples the device circuitry 305 of the IED 302 with the communications network 307. Alternate embodiments may have power management control functions 305b in place of data measurement circuitry. For example, a relay may include a control device and corresponding control functions that regulate electricity flow to a load based on preset parameters. Alternately a revenue meter may include data measurement circuitry that logs and processes data from a connected load. IED's may contain one or the other or combinations of circuitry. In an alternate embodiment the circuitry includes phasor monitoring circuits (not shown) which comprise phasor transducers that receive analog signals representative of parameters of electricity in a circuit over the power distribution system. Further detail and discussion regarding the phasor circuitry is discussed in U.S. patent application Ser. No. 08/798,723, captioned above.

Figure 3B:
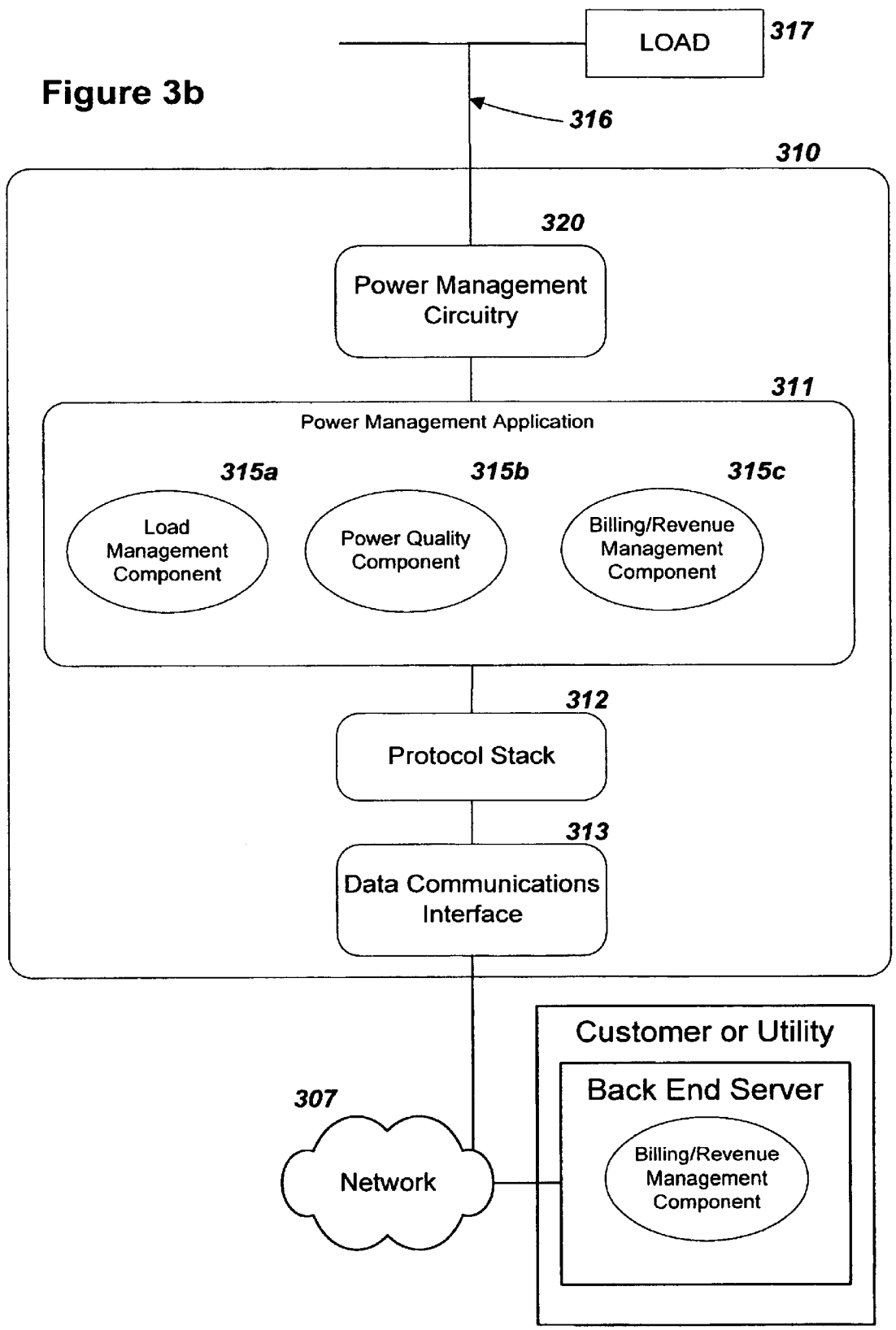
FIG. 3b illustrates the internal components of an IED for use with the embodiment of FIG. 1.

FIG. 3b illustrates a more detailed embodiment of the IED's 310 power management application components 311 and protocol stacks. The IED 310 includes power management application components 311, a communications protocol stack 312 and a data communications interface 313 (as was noted above, in alternate embodiments, the protocol stack 312 may include the data communications interface 313). The application components 311 includes a Load management component 315a, which measures the load's 317 consumption of electrical power from the portion of the power distribution system 316, a Power Quality component 315b, which measures power quality characteristics of the power on the portion of the power distribution system 316, and a billing/revenue management component 315c, which computes the quantity and associated value of the incoming power. The power management components are connected to the network via the data communications interface 313 using the communications protocol stack 312 (described in more detail below).

In one embodiment, a Billing/Revenue Management component on a back end server receives the billing and revenue computations over the network 307 from the billing/revenue management component 315c on the IED 310. These computations are translated into billing and revenue tracking data of the load 317 associated with the IED 310. The Billing/Revenue Management component on the back end server then reports the computations to the appropriate party operating that particular back end server or subscribing to a service provided by the operator the back end server, either the consumer or provider of the electrical power. Additionally, the Billing/Revenue Management component 315c on the IED 310 or the Billing/Revenue Management component on the back end server computes usage and cost computations and tracking data of the associated load and reports the data to the appropriate party. In a still another embodiment, IED 310 transmits billing and revenue data directly to the Billing/Revenue Management component over the network 307 and the Billing/Revenue Management component computes usage and cost computations and tracking data of the associated load and reports the data directly to the appropriate party. Furthermore, tariff data received from the utility by the Billing/Revenue Management component 315c is factored into usage or cost computations.

Figure 3C:
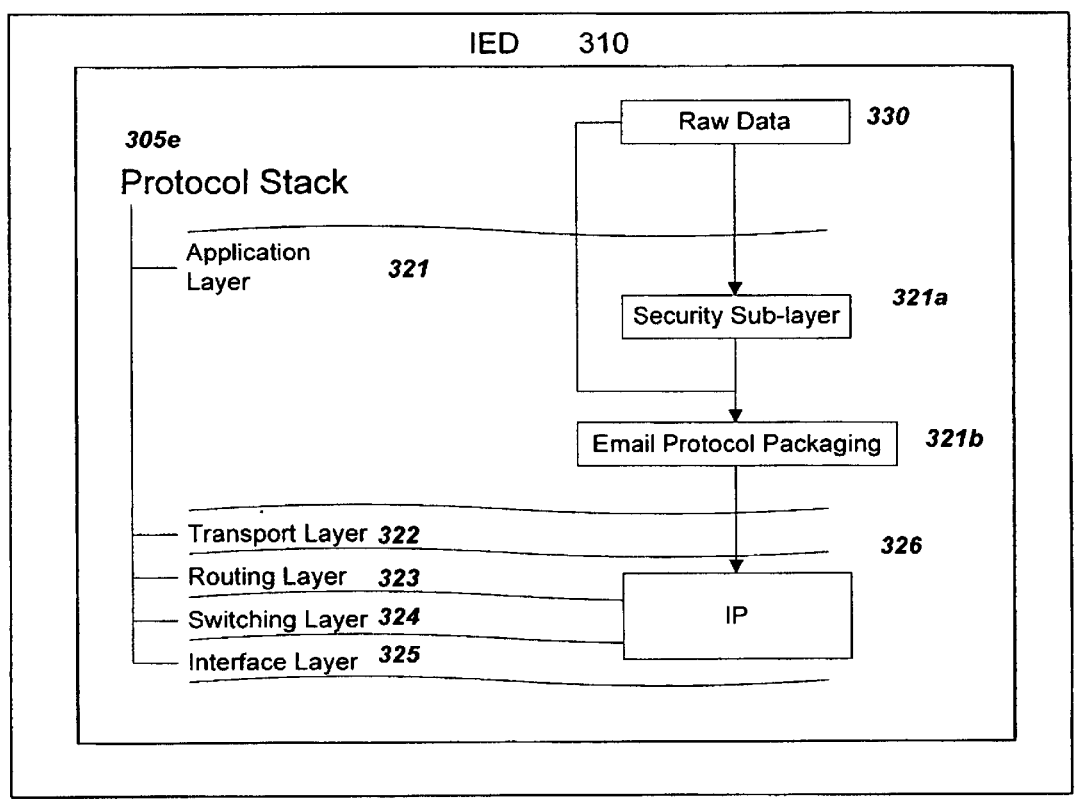
FIG. 3c illustrates a preferred protocol stack of an IED for use with the embodiment of FIG. 1.

FIG. 3c illustrates a preferred embodiment of the communications protocol stack 305e. In the preferred embodiment the connection between devices coupled with the network 110 is established via the Transmission Control Protocol/Internet Protocol ("TCP/IP") protocol suite. To facilitate communications over a network or other communications medium, devices typically include a set of software components known as a protocol stack. The protocol stack handles all of the details related to communicating over a given network so that other application programs executing on the device need not be aware of these details. The protocol stack effectively interfaces one or more application programs executing on the device to the network to which the device is connected. Typically, the protocol stack is arranged as a layered architecture with one or more software components in each layer. In the preferred embodiment, the protocol stack includes an application layer 321, a transport layer 322, a routing layer 323, a switching layer 324 and an interface layer 325. The application layer 321 includes all of the applications component software and/or power management component software. The application layer 321 is coupled with the transport layer 322. Applications or software components in the application layer communicate with the transport layer in order to communicate over the network. In the preferred embodiment, the transport layer is implemented as the Transmission Control Protocol ("TCP"). The transport layer, using TCP, divides communications from the applications of the application layer 321 into one or more packets for transmission across the network. The transport layer adds information about the packet sequence to each packet plus source and destination information about what application component generated the communication and to what application component on the receiving end the communication should be delivered to once reassembled from the constituent packets. The routing layer is coupled with the transport layer and is responsible for routing each packet over the network to its intended destination. In the preferred embodiment, the routing layer is implemented as the Internet Protocol ("IP") and utilizes internet protocol addresses to properly route each packet of a given communication. The switching and interface layers 324, 325 complete the protocol stack and facilitate use of the physical hardware which couples the device to the network. This hardware may include an Ethernet interface, a modem, or other form of physical network connecting including RF based connections such as Bluetooth interfaces. Generally, the preferred embodiments are capable of communicating via any network which transmits information utilizing the TCP and IP, collectively TCP/IP, protocols as are known in the art. TCP/IP is essentially the basic communication language of the both the Internet and private intranets. TCP/IP utilizes the communications protocol stack and can be described as comprising a TCP layer which manages the decomposing and reassembling of messages from the application layer 321 into smaller more manageable packets, and the IP layer which handles the addressing of the packets. The IP layer comprises the routing layer 323, the switching layer 324 and the interface layer 325. The interface layer 325, as described above, makes the physical connection with the network utilizing connections such as Ethernet, dial-up-modems, Point-to-Point Protocol (PPP), Serial Line Interface Protocol (SLIP), cellular modems, T1, Integrated Service Digital Network (IDSN), Digital Subscriber Line (DSL), Bluetooth, RF, fiber-optics or AC power line communications. In an alternate embodiment multiple interface layers 325 are present. For example, the interface layer 325 contains both an Ethernet and cellular modem thus enabling the IED to connect to the network with either interface. This redundancy is advantageous if one interface is inoperable due to a local Ethernet or cellular network outage. It is preferable that one or more of the application components in the application layer 321 implement TCP compatible protocols for the exchange of their communications over the network. Such TCP compatible protocols include the Instant Messaging protocol, file transfer protocol ("FTP"), or Hypertext Transport Protocol ("HTTP"). In addition, a Secure HTTP (S-HTTP) or Secure Socket Layers (SSL) may also be utilized between the application layer 321 and the transport layer 322 for secure transport of data when HTTP is utilized. S-HTTP is an extension to HTTP that allows the exchange of files with encryption and or digital certificates. SSL only allows authentication from the server where S-HTTP allows the client to send a certificate to authenticate to the user. The routing layer 323 and the switching layer 324 enable the data packet to arrive at the address intended.

In operation the IED monitors the power distribution system for events such as wave shape deviation, sag, swell, kWh, kvA or other power usage, consumption, or power quality events and disturbances. In one embodiment, when the IED detects an event, it processes the event and generates an email message using an email client application component for transport over the network to a back end data collection server. Raw data 330, such as the error message generated from the IED or a billing signal, is passed into the application layer's 321 Security Sub-layer 321a where it is encrypted before email protocol packaging 321b takes place. Once the data 330 has been encrypted and packaged, the message is passed through the remaining IP layers 326 where the message is configured for transmission and sent to the destination address. In one embodiment, the destination address is for a back end server implementing a data collection application component. This back end server may be operated by the consumer or supplier of electrical power or a third party as described above. In an alternate embodiment the Security Sub-layer 321*a* includes authentication or encryption, or alternatively the Security Sub-layer 321*a* is bypassed. The application layer may include application components which implement protocols that are designed to pass through a firewall or other type of software that protects a private network coupled with a publicly accessible network. Multiple redundant data messages may be sent from the IP layer to ensure the complete data packet is received at the destination. In the above operation, the protocol stack, which includes an SMTP or MIME enabled email client, is a scalable, commercial product such as the Eudora™ email client manufactured by Qualcomm, Inc., located in San Diego, Calif. In an alternate embodiment data messages may also be sent to redundant destination email addresses to ensure delivery of the message. Quality of Service (QoS) may also be implemented, depending on the volume of bandwidth required for the data, ensuring reliable and timely delivery of the data. QoS is based on the concept that transmission rates, error rates, and other characteristics of a network can be measured, improved and, to some extent, guaranteed in advance. QoS is a concern for continuous transmission of high-bandwidth information. The power quality events, consumption, disturbances or other usage data may be stored in the IED and sent to the destination address upon request from an application component operating at the destination address, upon pre-determined time intervals and schedules, upon pre-defined events or in real time. In an alternate embodiment a IED may transport data or requests to or receive data or requests from other IED's directly, also know as peer-to-peer communications. Peer-to-peer is a communications model in which each party or device has the same capabilities and either party or device can initiate communication sessions.

In an alternate embodiment the Security Sub-layer 321*a* may include multiple encryption keys, each conferring different access rights to the device. This enables multiple users, such as a utility and customers, or multiple internal departments of a utility or customer, to send or receive data and commands to or from the IED. For example a customer's IED sends out two encrypted messages, one billing data and one power quality data, to the customer's office site. The billing data message is encrypted at a level where only the internal accounting department has access to decrypt it. The power quality data message is encrypted at a different level where the entire company can decrypt the message. Furthermore, in the preferred embodiment, commands sent to or from the IED are coupled with the appropriate encryption key. For example, the IED's Security Sub-layer 321*a* may only permit billing reset commands to be received and processed if the command has been authenticated where the point of origin was the appropriate customer or utility. Further, encrypted email messages may also include various encrypted portions, each accessible and readable with a different encryption key. For example an IED sends out one message to both the utility and the customer containing billing data and power quality data. The data is encrypted with two different encryption keys so only the utility can decrypt the power quality data and only the customer can decrypt the billing data.

In operation the IED monitors the power distribution system 301 for billing events such as, kWh or kVA pulses. In one embodiment the IED may store billing events and transport the data to the power management application components operating on a back end server either upon request or upon pre-determined time intervals. Alternately the IED may transport billing event data in real time to the back end server. Data may be filtered through the either the Back End Server's or IED's power management components or any combination or variation thereof, before being entered into the Billing/Revenue Management component where billing, revenue, cost and usage tracking are computed into revised data. The Billing/Revenue Management components either stores the computations for future retrieval or pushes the revised data to the appropriate party, such as the consumer or provider of the electric power system. Data can be retrieved upon command or sent or requested upon a scheduled time.

In the preferred embodiment the back end server's operate in a similar approach to the IED's. The back end server contains a transport protocol stack and power management application components. Alternatively, a back end server could be a function or component of the IED, i.e., implemented as an application component.

The IED 402 implements power management functions on the whole electrical power distribution system 400 or just a portion thereof. Referring to FIG. 4*a* the IED 402 monitors the electrical power via the system 400 to a load 401 and reports events and data to the power management application components 411 through the network 410. The power management application components 411 are preferably operating on a back end server. The events and data are collected and processed through the automated meter reading components, billing/revenue management components or a combination and variation thereof, and revised data or commands are sent back to the IED through the network 410, enabling control of the power flow and distribution of the loading on the power distribution system. The automated meter reading component allows for retrieval and collection of data for the customer, utility or third party. The component further allows for schedule driven, event driven or polling commands which are operable to push data onto the network.

Figure 4B:
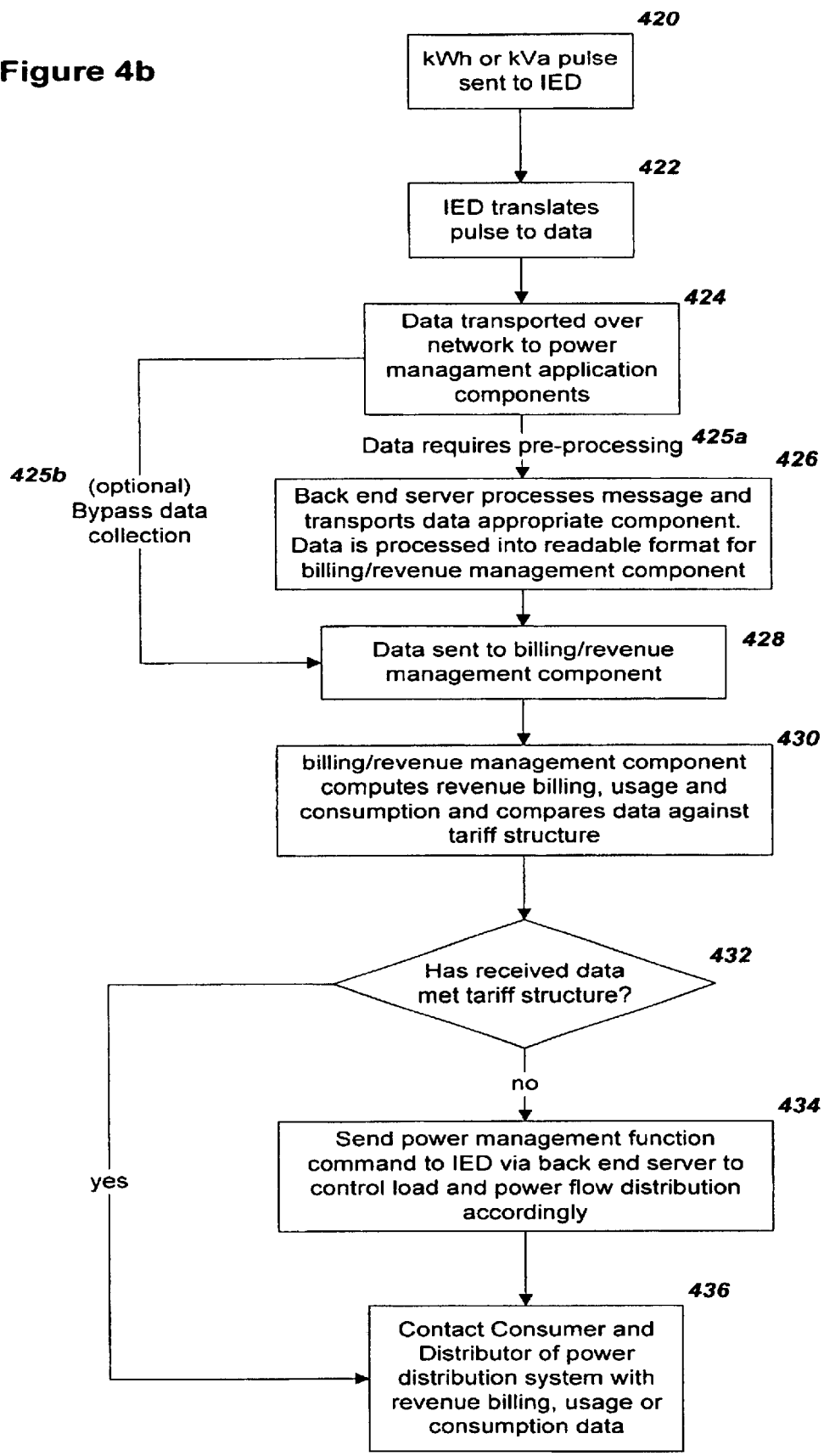
FIG. 4b illustrates the use of a power management application component.

The power management functions implemented by the IED's enables the back end servers or IED's to control power flow and distribution over the electrical power distribution system. Specifically the power management application components process power measurement data and generate power measurement and reporting commands, transmitting them to the back end servers or IED's for execution. Referring now to FIG. 4*b*, in one preferred operation a load is monitored by a IED where kvA or kWh pulses 420 translated into data 422 are sent in real time over the network 424 to the Application via email or another transport protocol. If pre-processing is required 425*a* the raw pulse data is transported into a data collection server or component where it is translated into a format readable by the billing/revenue management component 426. Alternately, the billing/revenue management component may be configured to receive and process data without pre-processing 425*b*. Once sent to the billing/revenue management component 428 the data is compared and analyzed according to 430 for usage, consumption or billing revenue ranges against a pre-determined tariff structure 432 where any anomalies, excess or shortages are reported back to the IED in the form of a command to a power management function which controls the power flow and load distribution accordingly 434. The components further contact the required parties, such as the consumer or provider of the load, over the network, forwarding power quality, billing, usage or consumption reports or any power management functions that were required against the set tariff structure according to 436.

FIG. 5*a* illustrates a preferred embodiment for a usage and consumption management application of the power management architecture. The IED 502 implements a power management function of controlling the source of electrical power for the load 501 from either energy supplier 1 505 or energy supplier 2 506. The application is designed to take advantage a deregulated marketplace and operate the load 501 from the most cost efficient energy supplier at the given time period. Which supplier is most efficient may fluctuate frequently as a function of the energy market and supply and demand for electrical power. Referring to FIG. 5b, the IED 502 contains a usage and consumption management component which receives tariff and cost structures from multiple energy suppliers 505, 506. The component receives usage and consumption from the Load 501 and compares actual usage against multiple tariff structures choosing the most cost effective provider for a given load. Similarly the load management component 259, as shown in FIG. 2b, is utilized to connect and disconnect loads to and from the electrical distribution system during either low and high rate and demand periods, hence reducing the electrical power costs and demand. In the preferred embodiment the load management component 259 is programmed to run in an automated fashion based on feedback from the system, however in an alternate embodiment the component is operated manually based on user input.

For example, an IED 502 is connected to a power line 500 and associated load 501. The IED 502 measures power usage by the load and by converting a kWh or kVa pulse 511 into data 512 and transmits this consumption data 514 over a network 510 to a usage and consumption management application component operating on a back end server. The Usage and consumption management component receives and tracks cost and usage 516, 518 and upon receiving costs 520 compares rates for actual usage against multiple suppliers bids 522. Suppliers have the option to either push tariff structures to the application component or have tariff structures polled over the network. Once the most cost effective structure is determined by the usage and consumption management component, a command or function is sent to the IED 502 with the new tariff structure 523, 524 and the process is complete 530. Alternately, the new tariff structure is applied across to the billing/revenue management component where billing is applied to the usage and revenue reports are forwarded onto the appropriate parties.

In another example the usage and consumption management component determines all suppliers tariff structures are too expensive to warrant usage or consumption thus a command to reduce consumption to a desired level is transmitted over the network to the IED 525. Furthermore, an alternate embodiment includes application of real-time usage and cost monitoring of loads being measured by an IED and multiple energy and distribution system suppliers.

In an alternate embodiment the usage and consumption component is pre-programmed to monitor and shed loads based on a exceeding a set tariff structure. For example an IED 502 monitors a load 501 connected to a power distribution system 500. Energy is supplied by an energy supplier 505. The IED contains a tariff structure that has a limit of $0.80/kWh during peak hours of 6 am to 6 pm and a limit of $0.60/kWh for non-peak hours of 6 pm to 6 am. The IED 502 monitors the power usage of the load 501 vs. the actual tariff structure of the energy supplier and shuts the load 501 off if the actual tariff exceeds the limits of $0.80/kWh during peak times or $0.60/kWh during non-peak times.

The centralized power management component 255 allows the centralization of work at one location, such as a centralized billing server, load management server or master IED, which collects and processes data from various devices spread over the network. In operation, remote IED's connected to the network transmit data to the centralized power management component where operations such as billing, load management, usage and consumption reporting are processed in one central location.

Figure 6:
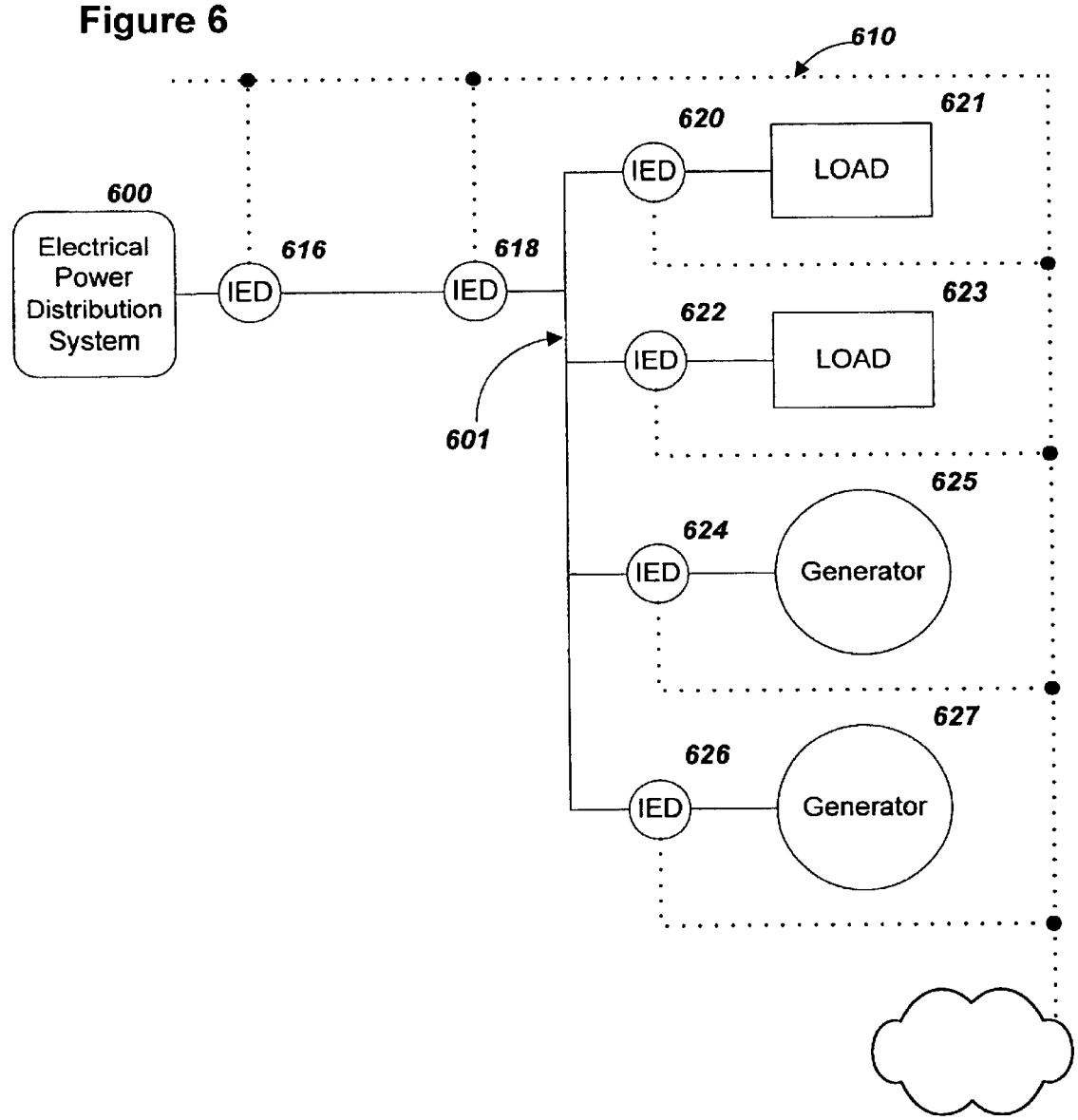
FIG. 6 illustrates a second embodiment using a distributed power management component.

The distributed power management component 254 allows for the distribution of work or data processing to various devices on the network. In operation, an IED measures or detects an occurring or impending catastrophic power quality event and alerts other downstream IED's (on the power distribution network) of the event thereby giving the downstream IED's an opportunity to disconnect or alter loads before the event reaches the downstream system and causes damage. The component further includes a function that, upon detection of an occurring or impending event, alerts downstream IED's or back end servers to alert their connected loads to either protect themselves from the outage by shutting down, or instructing them to shut down applications that may cause critical failure or damage if interrupted, such as writing to a hard-drive. FIG. 6 illustrates a preferred embodiment of the distributed power management component in action. An Electrical power distribution system 600 distributes energy over distribution lines 601 which are connected to multiple IED's 620, 622, 624, 626 which are present to continuously monitor the energy being fed onto their respective loads 621 623 and generators 625 627 on a given branch and furthermore all IED's 620, 622, 624, 626 are connected via a network 610 as described above. IED's 616 618 are also present on the distribution system 600 to continuously monitor energy being transferred onto the system as a whole. It will be appreciated that the loads and generators may reside on multiple or separate consumer sites. In operation, a catastrophic power quality event is detected on a load 623 by the attached IED 622. The IED 622 takes appropriate action, such as triggering a protection relay, on the load and further transmits communications of its actions to upstream IED's 616 618. This ensures local containment of the event by the IED 622 informing upstream IED's to not duplicate the action on the larger system. Obviously retaining upstream IED's as a backup is not discounted in this operation. Alternatively, the operation is utilized to coordinate downstream IED's over the network 610. For example an event may be detected at the distribution system 600 by an IED 616 monitoring the system 600 which triggers, for example, a protection relay. The IED 616 which triggered the protection relay communicates its actions to downstream IED's 618 620 622 624 626 over the network 610 allowing them to take appropriate intelligent action, such as disconnection the generators 625 627. It can be appreciated that IED applications may include a combination of the centralized and distributed power management components.

In one embodiment, a power reliability component 256 is provided in the IED to measure and compute the reliability of the power system. Power system reliability is discussed in commonly assigned U.S. Pat. No. 6,671,654, "APPARATUS AND METHOD FOR MEASURING AND REPORTING THE RELIABILITY OF A POWER DISTRIBUTION SYSTEM", captioned above. In the preferred embodiment the component 256 computes and measures reliability as a number of "nines" measure. The component includes a function which compiles the reliability of the power from other components located on back end servers or IED's, giving a total reliability. This function also enables a user to determine which part of the distribution system has the most unreliable power. Knowing this enables the user to focus on the unreliable area, hopefully improving local power reliability and thus increasing overall reliability.

Figure 7:
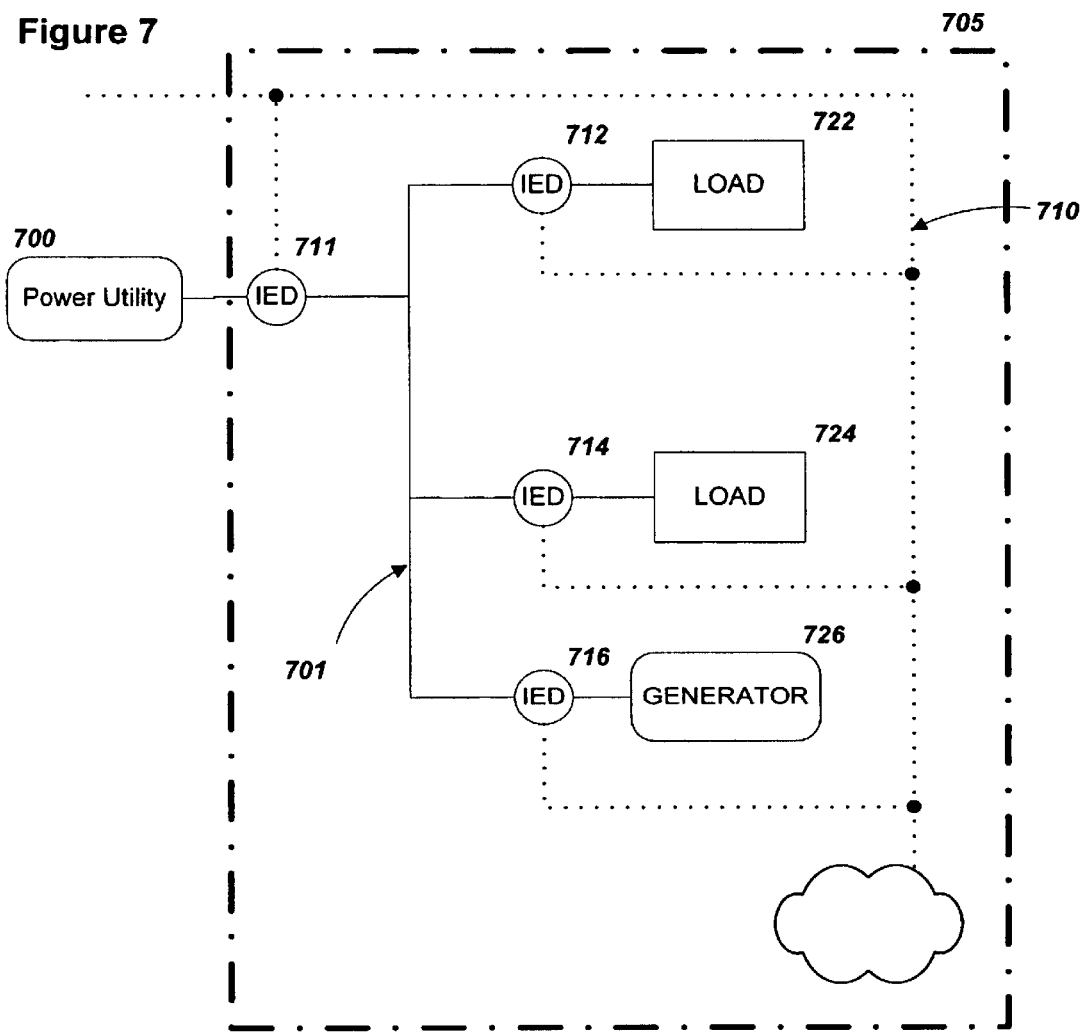
FIG. 7 illustrates a third embodiment using a power reliability component.

For example, referring now to FIG. 7, an IED 711 is connected to a network 710 and measures the reliability of the power distribution system 701 which supplies power to loads 722 724 within a customer site 705. The customer also provides a generator 726 which supplies power to the loads 722 724 at various times. The customer measures the power reliability of the system for the load 722 724 using the associated IED 712 714 and considers it unreliable. One IED's 714 power reliability component polls the other IED's 711 712 716 and determines the unreliable power source is coming from the generator 726. From this the customer can decide to shut off the power supply from the generator 726 in order to improve the power reliability of the system.

In another embodiment, a power outage component 265 is provided in the IED which informs the appropriate parties of a power outage using email or other transport protocols. In the preferred embodiment an IED is connected to a power system when a power failure occurs. The IED's power outage component 265 contains hardware, such as a battery backup and modem, which enables the IED to transmit a power failure warning to the appropriate parties, such as the utility or customer, such as by email over a network as described above. Further, a cellular modem may be utilized to call out to indicate the location of an outage. Physical locating algorithms such as cellular triangulation or telephone caller ID can be used to track or verify outage locations.

Figure 8:
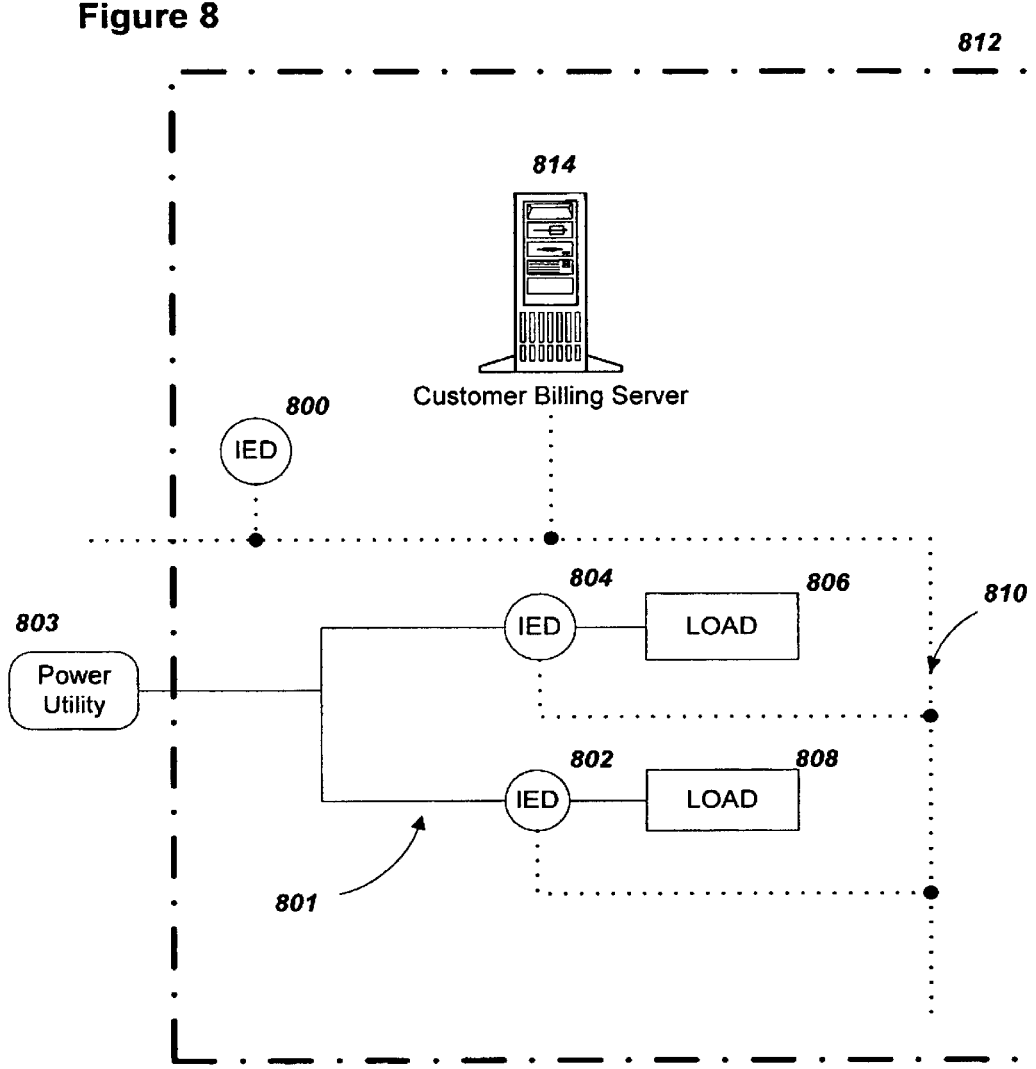
FIG. 8 illustrates a fourth embodiment using a peer to peer component.

Peer to peer communications between IED's and between back end servers are supported by the peer to peer management component 257. In the preferred embodiment peer to peer communications are utilized to transport or compile data from multiple IED's. For example, as shown in FIG. 8, an IED 800 is connected to a network 810. Multiple loads 806 808 draw power from a power utility's 803 power distribution line 801 and each load is monitored by an IED 802 804. An IED 800 polls load and billing data from all other IED's on the network on the customer site 802 804. Upon request, the IED 800 then transmits the load and billing data to the customer's billing server 814. In the preferred embodiment, the IED 800 communicates the load and billing data in a format which allows software programs inside the customer billing server 814 to receive the data directly without translation or reformatting.

Transmission of data in XML format allows a user to receive the data in a readable self-describing format for the application intended. For example, traditional data file formats include comma-separated value files ("CSV"), which contain values in tables as a series of ASCII text strings organized so each column value is separated by a comma from the next column's value. The problem with sending CSV file formats is the recipient may not be aware of each column's desired meaning. For example, a CSV file may contain the following information sent from a revenue billing application:

45.54,1.25,1234 ELm Street, 8500 where 45.54 is the kWh used this month, 1.25 is the kWh used today, 1234 Elm Street is the location of the device and 8500 is the type of device. However, if the recipient of the CSV file was not aware of the data format, the data could be misinterpreted. A file transported in XML is transmitted in HTML tag type format and includes information that allows a user or computer to understand the data contained within the tags. XML allows for an unlimited number of tags to be defined, hence allowing the information to be self-describing instead of having to conform to existing tags. The same information is transmitted in XML format as:

<billing_information>
    <kWh_month>45.54</kWh_month>
    <kWh_day>1.25</kWh_day>
    <location>1234 Elm Street</location>
    <device_type>8500</device_type>
    </billing_information>

Figure 9:
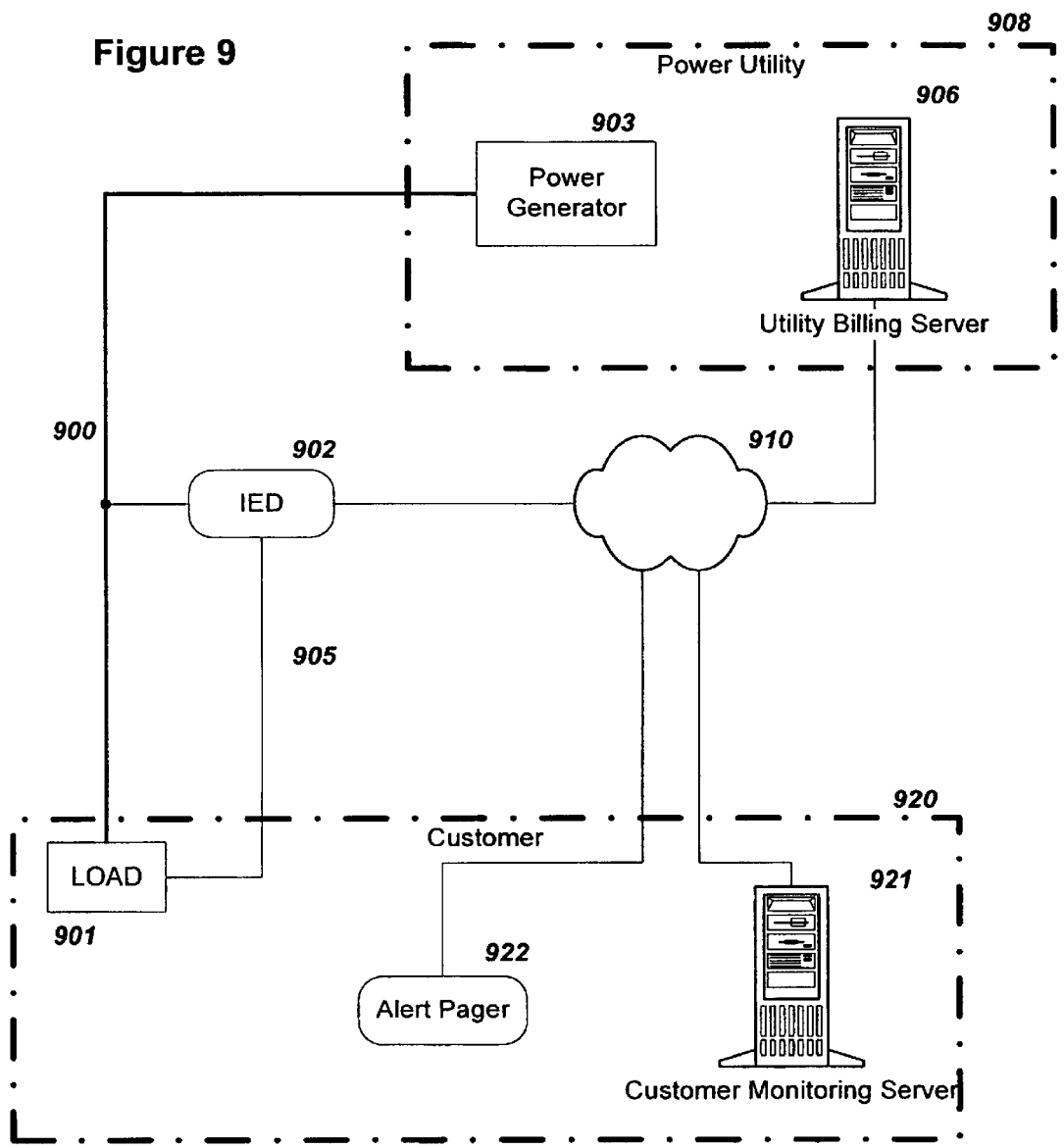
FIG. 9 illustrates an IED, for use with the embodiment of FIG. 1, transmitting data to multiple recipients.

Transmission in XML format allows the recipient to receive XML-tagged data from a sender and not require knowledge of how the sender's system operates or data formats are organized. In a preferred embodiment communications between IED's connected to the network are transmitted in XML format. An IED utilizes XML based client application components included within the power management applications and transmits the data in XML format so little or no post-processing is required. FIG. 9 illustrates an example of the preferred embodiment. An IED 902 is connected to a power distribution line 900 and associated load 901 owned by a customer 920. Power is supplied by a power utility's 908 power generator 903. The power utility also has a utility billing server 906 which compiles billing data from consumers drawing power from their power generators. The IED 902 is connected to the utility billing server via a network connection 910 and the IED 902 measures usage and consumption of the load, and other values associated with billing. The utility billing server 906 contains billing software, such as a MV90, which requires data in a specified format. Either upon request, or a pre-scheduled times, the IED 902 transmits the usage, consumption and billing data associated with the load 901 to the utility billing server 906 in XML format. The customer also has a monitoring server 921 which is dedicated to receiving billing data from the IED 902 and reporting usage and consumption to the appropriate parties, the monitoring server 921 also reads data in a specified format for its associated monitoring software. The IED 902 transmits the same usage, consumption and billing data to the monitoring server 921 in XML format. By utilizing XML data formats the data transmitted by the IED 902 can be read by multiple servers or IED's 902 that do not require knowledge beforehand of the order or type of data that is being sent. In an alternate embodiment an IED 902 may also receive inputs from peripheral devices which may be translated and combined in the XML transmission. For example, the load 901 is a motor which contains a temperature probe. The temperature probe is connected to the IED 902 and allows the IED 902 to monitor the motor temperature in addition to power data on the power distribution line 900. The IED 902 is programmed to act on the temperature input by shutting down the motor if the temperature exceeds a pre-defined critical level by tripping a relay or other protection device (not shown). The IED 902 is further programmed to alert the customer monitoring server 921 and an alert pager 922 and if such an action takes place. This alert transmission is sent in XML format so both the server 921 and the pager 922, which may be configured to read incoming transmissions differently, receive the alert transmission in the form it was intended. It can be appreciated that the IED 902 can receive data in XML format from multiple sources without complete knowledge of their file transfer notations.

Figure 10:
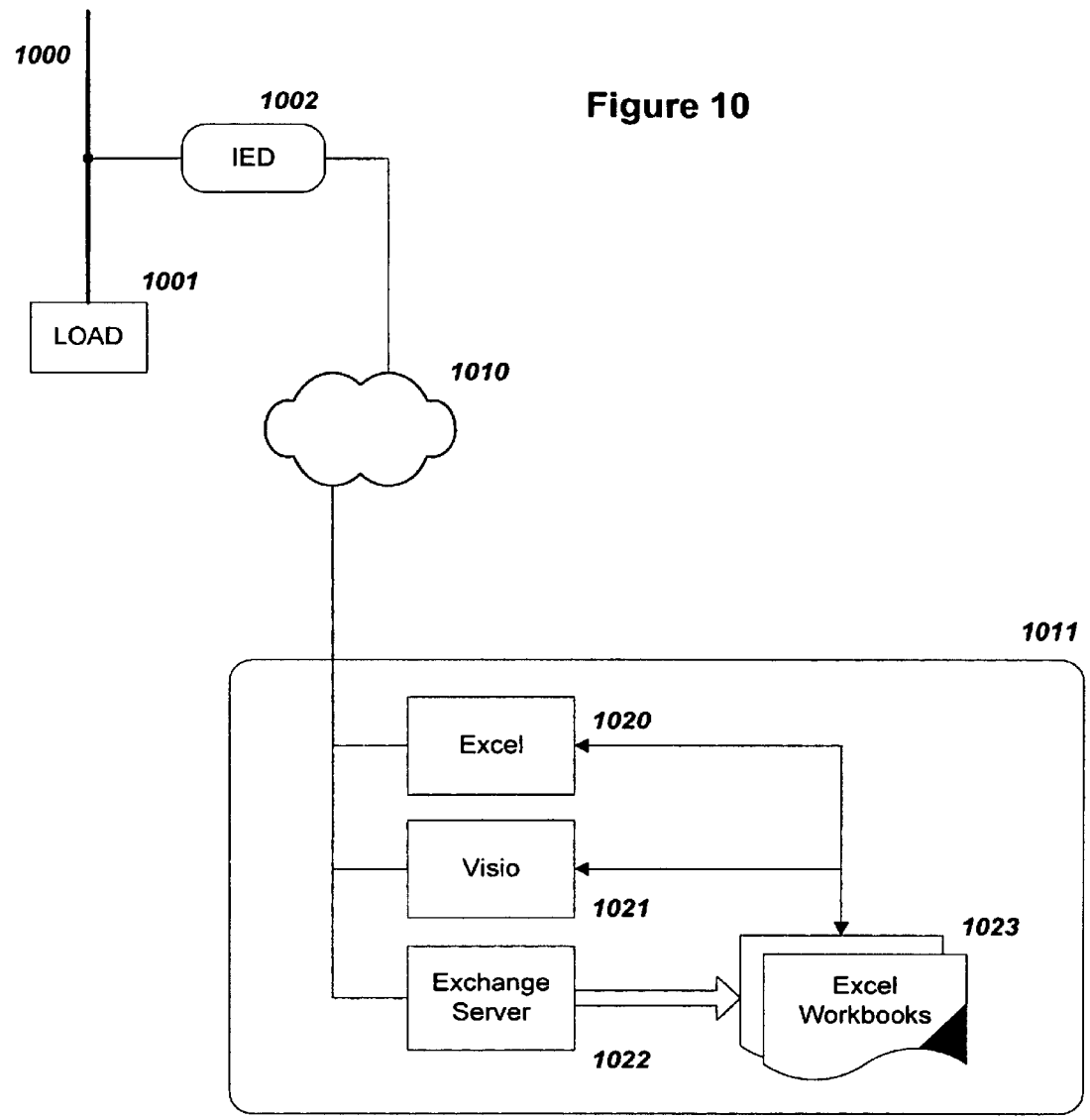
FIG. 10 illustrates a monitoring server, for use with the embodiment of FIG. 1, receiving data from an IED.

In an alternate embodiment the back end servers include software that is generally included on a majority of existing computer systems, such as Microsoft Office™ software, manufactured by Microsoft Corporation, located in Redmond, Wash. which includes the software applications Microsoft Word™ and Microsoft Excel™. The software receives data in a self describing format, such as XML, and the software includes off the shelf applications and processes such as a Microsoft Exchange Server, Microsoft Excel and associated Excel Workbooks, Microsoft Outlook and associated Outlook rules, Microsoft Visio and associated Visio Stencils, Template files, and macros which allow the user to view and manipulate data directly from the IED. In one embodiment the IED transmission format makes use of existing standard software packages and does not require additional low level components, such as a communications server communicating with a serial port, which are normally required to interface to the IED communication ports. Further, the embodiment does not require a separate database, as the data is stored in the software programs. This allows a user to view data from the IED using standard computer software. For example, referring now to FIG. 10, an IED 1002 monitors a load 1001 and passes the monitored data over network 1010 to a monitoring server 1011. The data can be transmitted using a variety of protocols, such as FTP, TCP/IP or HTTP, as described above. In the preferred embodiment data is transmitted in an HTTP based form or an SMTP form where the HTTP form is a self-describing format such as XML and the SMTP format is an email message. The monitoring server 1011 includes Microsoft Exchange Server 1022, Visio 1021, Microsoft Excel 1020 and Excel Workbooks 1023. The Excel software 1020 is capable of receiving data directly from the IED in a self-describing format, thus allowing the user to view real time load profiles or graphs and other monitored data directly from the IED in real time. The Visio software 1021 is also capable of receiving data directly from the IED in a self-describing format, thus allowing the user to process and view real time data in Visio format. Alternately, the IED transmits power quality, load, billing data or other measured or monitored values to the Excel Workbooks 1023 via the Exchange Server 1022. The Excel or Visio software is then capable of retrieving historical data directly from the workbooks.

Referring to FIG. 11, there is shown an exemplary screen display of a Microsoft Excel worksheet which is coupled with the IED 1002 as described above. In this example, the IED 1002 is a model 8500 meter, manufactured by Power Measurement Limited, in Victoria, British Columbia, Canada. The IED 1002 is coupled via a TCP/IP based network with a personal computer having at least 64 MB memory and 6 GB hard disk with a Pentium™ III or equivalent processor or better, executing the Microsoft Windows 98™ operating system and Microsoft Excel 2000. The computer further includes Microsoft Internet Explorer™ 50 which includes an XML parser that receives and parses the XML data from the meter and delivers it to the Excel worksheet. The worksheet displays real time data received directly from the IED 1002 in an XML format. As the IED 1002 detects and measures fluctuations in the delivered electrical power, it transmits updated information, via XML, to the worksheet which, in turn, updates the displayed data in real time. Note that all of the features of the Microsoft Excel program are available to manipulate and analyze the received real time data, including the ability to specify mathematical formulas and complex equations which act on the data. Further, display templates and charting/graphing functions can be implemented to provide meaningful visual analysis of the data as it is received. Further, the real time data can be logged for historical analysis. In one embodiment, the activation of a new IED 1002 on the network is detected by the worksheet which cause automatic generation of a new worksheet to receive and display data from the new device.

As described above, a generally accessible connectionless/scalable communications architecture is provided for operating power management applications. The architecture facilitates IED-supplier communications applications such as for automated meter reading, revenue collection, IED tampering and fraud detection, power quality monitoring, load or generation control, tariff updating or power reliability monitoring. The architecture also supports IED-consumer applications such as usage/cost monitoring, IED tampering and fraud detection, power quality monitoring, power reliability monitoring or control applications such as load shedding/cost control or generation control. In addition, real time deregulated utility/supplier switching applications which respond in real time to energy costs fluctuations can be implemented which automatically switch suppliers based on real time cost. Further the architecture supports communications between IED's such as early warning systems which warn downstream IED's of impending power quality events. The architecture also supports utility/supplier to customer applications such as real time pricing reporting, billing reporting, power quality or power reliability reporting. Customer to customer applications may also be supported wherein customers can share power quality or power reliability data.

Using XML to transfer data within a power monitoring system, as was described above, can further simplify the interoperability among IED's and between IED's and other software or hardware systems/devices. Given the limitations of modern data communications methodologies, and that uses of these methodologies continuously push the boundaries of newer/updated technologies, it is typically not possible to communicate an entire data file, such as an XML document, substantially instantaneously from one device to another. Alternatively, where it is possible to communicate an entire data file substantially instantaneously, it may be advantageous to break up the file as described and communicated in multiple pieces.

Typically, when transferring data, such as XML documents, between devices, or otherwise receiving or transmitting such data to or from a source, such as a storage device, network or other device, etc., the entirety of the data is broken down into a collection of subsets compatible with the communications medium being used. For example, communications over the Internet are typically broken up into multiple packets. These subsets are then substantially sequentially transmitted or "streamed" over that medium to the receiver who receives the data. The data may be broken down into blocks, packets or other subsets for transmission, the sequence or collection of these subsets being referred to as a "data stream." These transmitted subsets may then be transmitted, in order, out of order, via the same or different communications paths, to the receiver who reassembles the communication. Thereby, there is a minimum latency incurred before the first of the subsets are received and an overall delay incurred until all of the subsets have been received. Further, when all of the subsets of the data are needed to process the whole of the data, the receiving device is limited to waiting for all of the subsets to arrive prior to being able to process that data. In addition to this delay, the receiving device also incurs the resource cost of having to be capable of receiving and buffering the entire data. It will be appreciated, that while the disclosed embodiments are discussed in relation to communications over wide area networks, such as the Internet or intranets, communications over other mediums are also contemplated, such as communications over device interfaces, such as PCI, serial-ATA, USB, or IEEE 1391 ("fire wire"). In addition, the disclosed embodiments are discussed in relation to "processing" of data wherein processing may include generation/transformation of that data for subsequent transmission, in whole or in part, by the transmitting device and translation/ interpretation/transformation/parsing of received data by the receiving device. Generally, it will be appreciated that the techniques disclosed herein may be equally applicable to both the transmission and reception of data.

For example, XML documents may be processed using several different methods which are typically memory or otherwise resource intensive. Using such methods, the complete XML document, or the data equivalent to the complete document, is stored/maintained in the memory of the processing system while it is undergoing such processing. As the memory capacity of the processing system is normally not a concern for most applications, such methods, which operate on the complete XML document, work just fine. Unfortunately, typical IED devices, as described above, include only a limited amount of available memory to store XML messages/documents as they are received or generated. In many cases, manufacturing costs and/or design limitations necessitate including a smaller amount of memory than is necessary to store the entirety of a typical XML document prior to or during parsing or transmitting. Further, as new and more resource intensive uses and technologies are developed, the memory capacity and processing resources of existing devices, sufficient when the device was first installed, quickly becomes insufficient. Thus there is a need for a method of incrementally generating and parsing XML documents without having to buffer the complete XML document in memory before, during or after processing. This reduces the processing delay incurred in processing the XML due to the latency of receiving the first processable increment and reduces the amount of memory and other resources that must be made available or otherwise reserved for the processing. Further, memory capacity as a limitation on future development is mitigated.

The disclosed embodiments relate to decomposing an XML document into a set of incremental processable segments or portions and "pipelining" the processing, i.e. generation or transformation, and communication, i.e. reception or transmission, of those segments through independent processing stages, such that processing of each segment can be completed independently of the processing of the other segments. The types of data that can be transferring using incrementally generated or parsed documents include load profile data, power quality data, energy data, alert messages, status information, energy management configuration information, price, cost and temperature data as well as other power management data or derivations therefrom, as described above, presently known or later developed.

An XML document is essentially a collection of ASCII characters arranged in a meaningful format according to the XML specification. As the ASCII data of an XML document is incrementally received, it initially has no meaning to the receiving system other than that it is expected to be an XML document. This subset of data is not necessarily valid or well formed XML code but may be fed to a parser or other interpreter. However, the parser or interpreter may be unable to begin the parsing or interpretation of the XML code until enough data has been received to provide minimally recognizable XML code, referred to herein as a processable segment. An example of a processable segment is an XML token which is the smallest unit of XML code. Examples of XML tokens include "<", ">", element names, character data, etc. An XML fragment is a subset of an XML document built from XML tokens and other XML fragments according to the syntax of XML. An XML fragment may comprise one or more processable segments.

Figure 12:
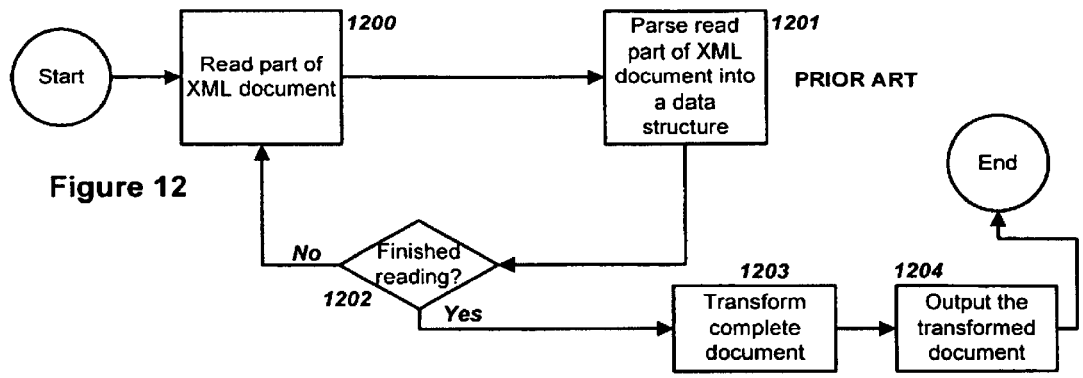
FIG. 12 illustrates an exemplary method of reading an XML document.

FIG. 12 shows one method of reading an XML document in its entirety prior to transforming that document in some way. It will be appreciated that the transformation may include preparing a generated document for transmission to a destination or parsing a received document for subsequent interpretation/processing. Blocks 1200, 1201 and 1202 essentially form a loop which reads in the entire document from its source, i.e. receives all of the subsets of the data, before permitting execution of the transformation block 1203. In particular, for an exemplary XML document which is being received or otherwise read in anticipation of parsing and translation, part of the document is read 1200, and then stored into an internal data structures 1201. This process is repeated for the subsequent parts of the document as long as there is more incoming data left 1202. Once the XML document has been completely read, the transformation 1203 of the XML document occurs. Finally the transformed document is output 1204. Note that blocks 1200, 1201 and 1202 must complete before blocks 1203 and 1204 can be performed, i.e. the complete document needs to be read and stored before the next step can occur.

As used herein, the terms sequential and incremental are used to refer to applications or computer operating environments/architectures which operate incrementally on data streams, i.e. operate on a portion of the data, or a subset thereof, in the stream as it is received and generating an output, before processing the next data, portion, or subset thereof. Typically, a sequential or incremental application is implemented, as described herein, as a series of processing stages, each stage consuming its input from a source or prior stage and generating an output to a sink or to the next stage before consuming and processing the next input. Although each processing stage must wait for the previous stage to generate its output before processing that output, the processing performed by the particular stage is independent of the other stages, i.e. is self-contained and does not involve the other stage, e.g. the previous stage is free to accept and process additional input. This is distinguished from the use of the term "sequential" for computer architectures to distinguish these architectures from parallel processing architectures which generally refer to the way in which computer program code is executed by the architecture, both of which may be used to implement the disclosed embodiments. Additionally, other software development techniques may also be used to implement the disclosed embodiments such as threading and concurrency.

Incrementally generated or parsed/transformed/translated XML has the advantage that neither the complete XML document, nor the representation of the XML as a data structure, need be stored in the memory of the processing device at any one time for the generation or parsing operation to be able to operate, thereby reducing the delay in commencing processing or transmission of the data and the amount of memory needed, and consequently the manufacturing cost, with the additional advantage of extending the capabilities of the IED to handle XML documents of unlimited or unspecified size. Only those parts of the document currently being processed need to be contained in the memory. Once processed, those parts can be discarded, such as by using an automated garbage collection mechanism as provided by Java, or alternatively, by manually releasing the resources using specific functions. When receiving data from a source, the unprocessed parts can be in transit or otherwise contained in the lower communication layers or maintained at the source device that is communicating the source data or XML document to the XML processing device, until needed.

Processing of the incremental data may include encrypting or decrypting the incremental data, generating authentication information, compressing or translating the incremental data into other formats and protocols. Generating authentication information can include signing the data stream to verify the identity of the originating IED and validity of the data stream to consumers of the data stream or alternatively adding a hashing function to verify that the data has not been tampered with while being transported across the intervening network. In one embodiment, the transformations are implemented using a lazy functional programming language such as Haskell, or a declarative language such as eXtensible Stylesheet Language ("XSL") which allows for a simple implementation, i.e. the intermediate data in the chains can be deleted once it has been processed. Other examples of transformations that can be implemented include transforming from an original character set to a different character set, transforming from an internal data structure into a formatted human or machine readable structure or other transformations necessary to transmit the data over a communication link from the IED to a client computer. Some sample character sets or formats that can be used include Unicode UTF-8, Unicode UTF-16, ASCII, Latin encoding and base64 formats. The eventual transmission protocol used can also be viewed as another transformation of the data. The data can be transmitted in SMTP, MIME, HTTP, XML, wireless binary XML, SOAP, CSV and other protocols and formats as known in the art. The transformation may also be a unity transform, where the inputs are copied to the outputs, but the transform has the side effect of computing some value based on the inputs such as a one-way hash function that can be appended onto the data stream or transmitted using other methods.

While the embodiments described below utilize Internet based electronic mail as the medium to communicate the incrementally generated XML documents, it will be appreciated that other communications protocols may also be used, such as HTTP, FTP, etc. Further, non-TCP/IP based protocols may also be used. TCP/IP based protocols offer the advantage of standardization, a packet based implementation, widespread implementation and ease of use.

Regarding the generation of documents for subsequent communication, there are known methods to incrementally generate data messages in simple formats, such as CSV. CSV formatted data messages simply consist of ASCII text or other low-level data encoding format, arranged in a prescribed record format wherein the records are defined by column delimiters, such as commas, and row delimiters, such as line-breaks. Each record is encoded independently of the other records. Incremental generation of such a file includes generating each row of data, including the data elements separated by column delimiters, followed by the row delimiter and providing that data row for subsequent processing, such as by providing it to the communications layer which subsequently transmits it to the destination, for example, in a packet making up the body of a simple email message.

Unfortunately, including data messages in the body of an electronic mail message requires additional custom logic on both the transmitting and receiving ends to insert and properly extract the message, especially where multiple separate messages are included. In addition, Internet based email messages are typically routed through many different intervening email systems and/or routers, all of which may not handle the message body in a standardized manner, potentially resulting in corruption of the message(s). This limits the complexity of the data messages that can be transmitted in this manner.

Additionally, such systems unreliably handle documents which utilize a markup-based format, such as XML. Such documents present additional complexities in that the encoding of data into the markup format at one point in time may affect the encoding of subsequent data into the markup format. For example, encoding one piece of data may require that a begin-tag be generated, for example to indicate the data type of the data to follow the tag, and further necessitating future generation of an end tag. Further, such tags may be nested. Should the body of the document be compromised, the XML code contained therein may no longer be well formed and/or valid, resulting in unreliable processing of the XML code. As discussed in more detail below, XML code is considered well formed if it is structured according to the syntax described in the XML specification. XML code is considered valid if the particular code fits within the overall XML schema. An XML schema represents the interrelationship between the attributes and elements of an XML object (for example, a document or a portion of a document). XML code can be well formed but not well valid.

In one embodiment, an incremental XML generator is coupled with an electronic mail generator which includes the incrementally generated XML document as a Multi-Purpose Internet Mail Extensions ("MIME") attachment to the email message. MIME is an enhancement to the original electronic mail protocols allowing the exchange of messages including data files preserved in their original encoding and format. Using MIME, the data, such as the XML document, is attached to the email message as a MIME attachment. The incremental XML document generator incrementally generates an XML document and attaches the data of the document to the email message as the email message is streamed/transmitted to the email server. In this embodiment, both the communications process and the receiver of the message are unaware that the MIME attachment is being generated as it is transmitted.

By attaching the XML document as a MIME attachment, the capabilities of the MIME protocol can be utilized. For example, multiple XML documents may be attached to the same email message. Further, standardized handling of MIME encoded messages ensures that those messages arrive intact. By convention, electronic mail applications do not modify email attachments but are permitted to modify the body of the message. In addition, standardized handling of MIME encoded messages upon receipt permits automated or user directed execution of applications based on the content of the MIME attachment. This may greatly simplify subsequent processing of MIME encoded messages.

In operation, an exemplary IED, according to the present embodiment, generates some data, such as a table of voltage measurements. This data is to be ultimately supplied to a remote management system for subsequent processing. The IED passes the data values, in real time as they are generated or, alternatively, in batch, in whole or in part, to the incremental XML document generator. As the generator receives the data, the data is encoded into the XML format and transferred to the communication layer for transmission. Wherein the data is delivered to the XML generator in batch, the generator may transfer the encoded XML data, as it is encoded, to the communications layer for transmission. At the beginning of transmission, the communications layer will generate the proper email message headers, setting up the XML document as a MIME attachment, and transmit them to the recipient system. Thereafter, as each piece of data is handed off to the XML generator, encoded in XML and transferred to the communications layer, the communications layer will transmit that data as part of MIME attachment. Once the last piece of data is provide to the XML generator, encoded and transferred to the communications layer for transmission, the XML generator will indicate to the communications layer that the message has ended. The communications layer will then properly terminate the message and attachment. To the receiving system, the email message will appear to be a standard MIME encoded email containing an XML document. The receiving system is not aware that the mail message (and the included MIME attachment) has been broken into multiple pieces for transmission.

There are several different methods to incrementally generate the XML document, and all are contemplated by the disclosed embodiments. One technique is to build a tree structure that contains the data that will be represented in the final document, perform the required transformations into XML encoded format on the data in the tree structure format, and finally serialize the document from the tree structure by traversing the tree structure and incrementally outputting the data stored at each node as each node is traversed. This technique, however, requires that the source data be complete and be placed into the tree prior to the transformations. Other techniques may perform the necessary transformations as the data is generated. FIG. 15 illustrates an exemplary method for generating 1500 and transmitting 1501 an XML document that cycles until the generation is complete 1502. The generation of the XML document in FIG. 12 may be accomplished using the exemplary transformations of FIG. 16. The transformations are from the source 1610 to Unicode translation 1620 to unity 1630, then either a hash value output 1640 or to XML parsing 1650 to HTTP transformation 1660 and to TCP/IP data sink 1670.

Parsing XML documents normally involves reading and instantiating the complete document in memory into some sort of data structure. Once the document has been parsed, then queries can be run against the data structure and the relevant data extracted. Even if the entire contents of data structure is needed by the application, the parsed data representing the XML document may not be in the data format for easy processing by the application. In that case the entire data structure must be processed again into yet another data structure in order to simplify the processing by the application. However, as described above, in memory constrained systems, there may not be enough memory to store the complete data structures that are required in this transformation if the complete document needs to be transformed at the same time. Using incremental techniques, specific parts of the document can be incrementally transformed to extract the required data.

There are three main methods of parsing an XML document. A pull parser describes an application consuming the XML document which asks for a specific element or the next element from the XML tree and the parser provides the next available element that meets the specified criteria. A push parser describes an application which is notified when specific elements (or each new element) are experienced when reading the document. Finally tree parsers read and process the complete document into a tree structure and general queries can then be executed on the complete document to extract any set of elements requested. In the case of XML this is typically a Document Object Model ("DOM") tree data structure. Once the DOM tree is built then queries for specific items can be run to extract the required information. Since on embedded systems memory usage is a concern in general, using DOM trees is normally not possible for large documents. Currently in embedded applications, instantiating the complete tree in memory and limiting the document size is the typical approach but with a severe size limitations on the document size. Larger documents can not be processed in embedded systems without significant memory use in current implementations. Pull and push parsers can be implemented in an incremental fashion and are preferred for uses where memory is constrained. The incremental approach may be useful for parsing data from a resource that is transitory like a HTTP data stream. Once the HTTP data stream has been closed the original data is unavailable.

Chaining multiple transformation blocks together may be used when parsing incoming data or generating outgoing data. Chaining blocks together is when the output of one block is fed into the input of the next block. The original input data is transformed by each block as it is executed. Each block does a transformation of the data to a format that can be easier to work with in the specific embedded system. Each chained transformation block can transform the data in some way from the input to the output of the transformation block. Examples of individual transformations include decrypting, decompressing or changing character set or other representations of the data, or a unity transform where the inputs are copied to the outputs but the transform has the side effect of computing one or more pieces of data such as a one-way hash function. When parsing SOAP messages, enough of the SOAP message can be parsed to determine the function to dispatch the rest of the SOAP message to. Once determined, the function can be called to finish processing of the remainder of the SOAP message. The function will return, and the remainder of the SOAP message can be processed, mainly to check for correctness for the specific data format being used. In the case of XML encoding this correctness check could be to check for well-formedness by ensuring the elements processed before dispatch to the function are correctly closed. In an alternative embodiment the remainder of the SOAP message can be ignored once the function returns.

When XML messages are parsed, validation is typically done to verify that the message is well formed and valid. Well formed means the XML document has the correct syntax. Valid XML means that the XML document has been validated against rules that apply for that document, typically described in a natural language such as English, Spanish, etc, or a schema language such as Document Type Definition ("DTD"), Schematron, Relax NG, Resource Description Framework ("RDF") Schema or an XML Schema Definition ("XSD") document. The DTD, Relax NG, and XSD, and the Web Service Definition Language ("WSDL") are metadata that describe the acceptable structure of XML document. RDF Schema describes the structure of a graph that is serialized in XML in the RDF format. RDF Schema is a data model typically serialized in XML. The metadata can be included either in the document itself or as a separate document referenced from with the XML document through a schema, DTD or namespace reference. The metadata describes the rules necessary to check the XML stream content to verify that the expected tags are present in the correct order and data types. Additionally the metadata can also describe the specific of binding values of elements and attributes to the data structures contained with the XML document. For embedded devices this metadata can alternatively be compiled into the devices code that validates instance documents as they are read, and optionally copies elements or attributes into data structures of appropriate type. A further alternative embodiment can be to compile the metadata when needed for some purpose such as validation on the device itself—"lazy" compilation. In this case the device embeds compilers which transform the metadata into machine code the device can execute or some intermediate code the device can further process into executable code. Examples include Java source code or virtual machine code.

Figure 13:
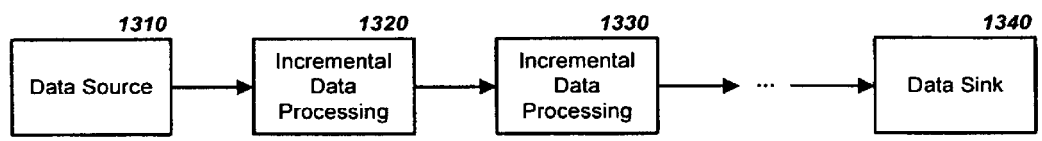
FIG. 13 illustrates a block diagram of an exemplary series of transformations according to one embodiment.

In a system where multiple transformations are to be performed on a given piece of data, implementation of the transformative functions may vary. FIG. 13 shows a block diagram of exemplary transformations chained together such that the output of one transformation is the input to the next transformation. In this example, referring to the tree/traversal based generation technique above, as each node of the tree structure is transformed, the transformed data is passed to the next transformation block and the current transformation block is free to receive and transform the next node in the tree. This continues until all the transformation blocks have executed on all the original input data (or the transformed version of the input data). The original document is input at the data source 1310. Next a transformation 1320 is implemented on the data. Additional transformations 1330 can optionally be implemented before the data is finally output 1340. By pipelining the transformation blocks such that the processing of each transformation stage may commence as soon as enough data is received from the source or prior stage, incremental processing, i.e. incremental generation, may be achieved, as described above. Note that the flow control structure of FIG. 14, described below in relation to the incremental reception and consumption of data messages, may be used with the transformation pipeline of FIG. 13. As data is supplied from the source, the flow control system of FIG. 14 determines when enough data to begin processing has been received, that data is then passed on to the first transformation block. Similar flow control may be placed between the stages of the pipeline so as to ensure that adequate data is supplied to each transformation stage.

As noted above, incremental generation and transmission of XML encoded documents can be performed transparently to the recipient, i.e. the incremental transmission looks identical to a normal transmission using TCP/IP based network protocols, aside from the potential increase in the number of transmitted data subsets. However, on the receiving end of the transmission, there are similar disadvantages in waiting for the entire message to be received before being able to commence processing/parsing of that message, i.e. XML document. Such disadvantages include, as described above, increased memory and resource allocation and the associated costs. It is therefore advantageous to implement incremental data consumption in the receiver to reduce the amount of memory and other processing resources necessary to process the received message.

As described above with respect to incremental generation of data, there are many ways to implement incremental consumption and processing of received data. In one embodiment, each transformation block 1320 is implemented as an independent code or functional block wherein the outputs and inputs of subsequent blocks are connected together. This is similar to "piping" data between command line programs in the Unix or Windows operating system command line environments. Each command performs at least one transformation of the input data and incrementally outputs the transformed data where it is then subsequently input into another command for more processing. In an alternative embodiment, the transformation blocks can be implemented as functional code modules executing within one or more threads or processes.

Figure 14:
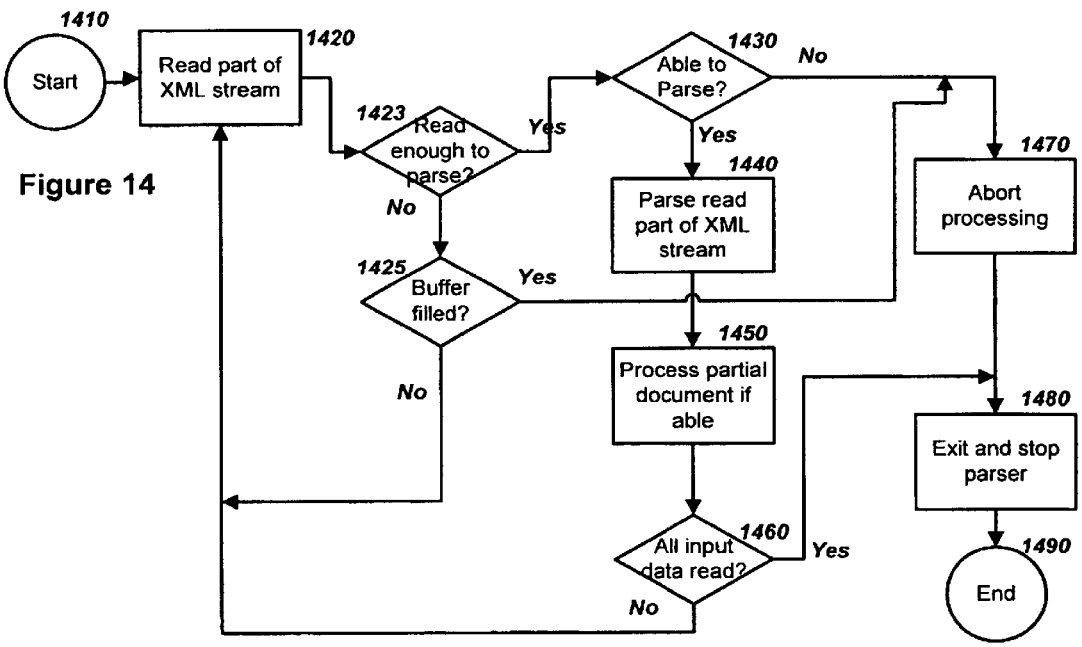
FIG. 14 illustrates an exemplary method of incrementally receiving an XML document according to one embodiment.

FIG. 14 shows one embodiment of an incremental XML processing system. The system incrementally receives the data stream comprising the XML document and determines whether enough data has been received to begin parsing and otherwise transforming the portion of the data. Once enough data has been received to begin parsing/transformation, the received data is parsed and transformed. Substantially simultaneously, the system continues to incrementally receive the data stream until enough data has been received as described above. This process continues until all of the XML document has been received. Starting at 1410, a portion of the data is input 1420, i.e. received from the sender. The amount read is checked to verify that enough has been received to process 1423. If not enough has been received then the status of the buffer is checked 1425 and if filled then further receiving of data is aborted 1470. If the buffer is not filled then further reception is attempted 1420. Assuming that enough data has been received for parsing then the data is verified for correctness 1430, parsed 1440 and processed by one or more transformation 1450. If more data is pending to be read 1460 then the cycle is repeated again. Once all the data has been read then the parser stops. If the input data is incorrect then the read, parse, process cycle is aborted and any clean up is done 1470 before the parser is stopped 1480 and the complete process is ended 1490. The transformation process 1450 can comprise multiple transformation processes chained together as previously explained. Using this procedure the code is able to directly generate the final output format from the input format with possibly multiple intermediate transformations.

In an alternative embodiment FIG. 14 may be implemented as a single block of code that mixes the reading, parsing and processing blocks together. In this embodiment, the combining of the application generating the data, transformation processes and output serialization of the data allows has the advantage of being typically less code (which can directly effect the amount of memory used overall). The disadvantages of this combination approach include less abstraction between the various read, parse and transformation blocks which can cause the code to be harder to develop, debug, and is generally more complex overall when compared to separating the described blocks into distinct code modules. In many embedded implementations the code memory savings from combining the transformations together can outweigh these drawbacks. Typically this method is frequently the simplest or most efficient implementation overall but allows for the least flexibility or expandability. As each block of data is input into a transformation block, that data block is transformed and immediately output. A data block can be as small as a single character and up to the size of the available buffer for that particular process but is smaller than the size of the complete document.

In one example of using the disclosed embodiments to transmit an XML document to an IED, the XML document comprises a series of commands to the IED, such as configuration commands. In operation, the sender incrementally sends the XML document to the IED. As the IED receives the data comprising the XML document, it continually checks the received data to determine whether or not it has received enough data to begin processing, i.e. a processable segment. Once enough data has been received, the processable segment is transferred to the processing logic which will transform the XML code into a form which can be processed by the IED to execute the encoded commands. One the processable segment is handed off to the processing logic, the IED returns to receive the next processable segment. In one embodiment, one or more buffer memories are provided to permit substantially simultaneous reception of processable segments. The process of receiving processable segments and handing them over to the processing logic continues until there are no more processable segments to receive. In the processing logic, each processable segment is passed through one or more independent transformations which collectively translate/interpret the encoded data and otherwise transform the data into a format comprehendible by the IED to execute the desired functions. As the processable segment is transformed, the logic implementing the transformation is free to accept the next processable segment. This process continues until the entire XML document has been received and processed.

In this way, processing of the XML document may begin as soon as the first processable segment is received, rather than upon receipt of the entire XML document. As each processable segment is received and processed, buffer memory storage and subsequent processing resources may be released for processing subsequent processable segments, thereby minimizing the necessary amount of buffer memory and processing resources.

In one embodiment, flow control may be implemented allowing the IED to control the incremental flow of data being received. Such flow control may include communications back to the sender of the data or controls at the communications layer to allow the IED to manage the flow of incoming data. This may be useful where the processing of a given processable segment is taking longer than expected, thereby causing a back-up in the pipeline. Further, where the received processable segments exceed the receiving buffer space, the IED can request that the sender further decompose the XML document into smaller processable segments. Flow controls may also be implemented to allow the received to re-request entire processable segments, or portions thereof, for example, where there has been an error in transmission.

In one embodiment of the incremental XML processing system described herein, the capability to handle errors is provided. Errors may occur if one or more processable segments of the XML document are too large to fit in the IED's available memory, are corrupted or otherwise comprised or the segment contains unrecognized or improper XML code, data or commands. When incrementally processing received XML, it is possible that many processable segments will be successfully processed prior to an error occurring. For a given XML document, it may be okay that only a portion of the overall file was successfully processed. In this case, the IED can attempt to re-request the unsuccessfully processed segment(s) or continue operations without those segment(s). Typically, however, if the entire XML document cannot be processed then none of the XML document should be processed. This may be the case for an XML document which contains a set of configuration commands and data. In such a case, partial configuration may result in an inoperable IED. Therefore, in one embodiment, a mechanism is provided which permits the IED to undo any completed processing the XML document when an error occurs. In one embodiment, the IED is capable of saving the complete operational state of the device prior to commencing processing of the XML document, or a processable segment thereof, and restoring that state should an error occur. In embodiments that are incapable of reversing the partial execution of the XML document, the XML document generator generates the XML code such that errors in processing some of the code does not affect the successfully processed code.

It is therefore intended that the foregoing detailed description be regarded as illustrative rather than limiting, and that it be understood that it is the following claims, including all equivalents, that are intended to define the spirit and scope of this invention.

What is claimed is:

1. An energy management device for managing the flow of energy in an energy distribution system, said energy management device for use in an energy management architecture for managing said energy distribution system, said energy management architecture comprising a network, said energy management device comprising:

a network interface operative to couple said energy management device with said network;

an energy distribution system interface operative to couple said energy management device with said energy distribution system, said energy management device further operative to measure at least one energy management quantity via said energy distribution system interface;

a processor coupled with said network interface and said energy distribution system interface and operative to process said at least one energy management quantity to manage the flow of energy; and wherein said network interface is further operative to incrementally receive one of a power management command and power management data encoded as an Extensible Markup Language (XML) document from said network, said XML document being received as a plurality of segments, wherein said network interface is capable of processing at least one received of said plurality of segments and extracting said one of said power management command and power management data therefrom prior to receiving all of said plurality of segments.

2. The energy management device of claim 1 further comprising a display.

3. The energy management device of claim 1 where said XML document is encoded into at least one of base64 format, Unicode UTF-8 format, Unicode UTF-16 format, ASCII and Latin encoding format before said network interface facilitates transmission over said network.

4. The energy management device of claim 1 where said XML document is encrypted, said network interface further operative to decrypt each of said plurality of segments as they are received.

5. The energy management device of claim 1 where said XML document is compressed, said network interface further operative to decompress each of said plurality of segments as they are received.

6. The energy management device of claim 1 where said XML document is authenticatable, said network interface operative to authenticate each of said plurality of segments as they are received.

7. The energy management device of claim 1 where said plurality of segments are transferred using at least one of SMTP, MIME and HTTP protocols.

8. The energy management device of claim 1 where said XML document further comprises at least one of a SOAP and wireless binary XML protocol.

9. The energy management device of claim 1 where said one of a power management command and power management data further comprises data based on at least one of load profile data, energy data, power quality data, an alert message, status information and energy management configuration information, price, cost, temperature.

10. The energy management device of claim 1 where said energy management device comprises at least one of relay, electric meter, revenue meter, power quality meter, water meter, air meter, gas meter, and steam meter.

11. An energy management device for managing the flow of energy in an energy distribution system, said energy management device for use in an energy management architecture for managing said energy distribution system, said energy management architecture comprising a network, said energy management device comprising:
   a network interface operative to couple said energy management device with said network;
   an energy distribution system interface operative to couple said energy management device with said energy distribution system, said energy management device further operative to measure at least one energy management quantity via said energy distribution system interface;
   a processor coupled with said network interface and said energy distribution system interface and operative to process said at least one energy management quantity to manage the flow of energy, and further operative to generate one of a power management command and power management data related thereto; and
   wherein said network interface is further operative to receive said one of a power management command and power management data from said processor, incrementally generate an XML document comprising said one of a power management command and power management data, said XML document being generated as a plurality of segments, wherein each of said plurality of segments is communicated to said network as it is generated.

12. The energy management device of claim 11 further comprising a display.

13. The energy management device of claim 11 where said XML document is encoded into at least one of base64 format, Unicode UTF-8 format, Unicode UTF-16 format, ASCII, and Latin encoding format before said network interface facilitates transmission over said network.

14. The energy management device of claim 11, said network interface being further operative to encrypt at least one of said plurality of segments.

15. The energy management device of claim 11, said network interface being further operative to secure at least one of said plurality of segments.

16. The energy management device of claim 11, said network interface being further operative to compress each of said plurality of segments.

17. The energy management device of claim 11 where said plurality of segments are communicated using at least one of SMTP, MIME and HTTP protocols.

18. The energy management device of claim 11 where said XML document further comprises at least one of a SOAP and wireless binary XML protocol.

19. The energy management device of claim 11 where said one of a power management command and power management data further comprises data based on at least one of load profile data, energy data, power quality data, an alert message, status information and energy management configuration information, price, cost, temperature.

20. The energy management device of claim 11 where said at least one energy management device comprises at least one of relay, electric meter, revenue meter, power quality meter, water meter, air meter, gas meter, and steam meter.

21. In an energy management device, a method of transmitting a communication from said energy management device over a network coupled with said energy management device, said method comprising:
   generating a set of data to be communicated over said network as an XML document;
   transforming each of said data into an XML format as it is generated; and
   communicating each of said XML formatted data over said network as it is transformed;
   releasing at least one resource utilized by said XML formatted data from said energy management device as it is communicated; and
   repeating said transforming and said communicating until the entire said set of data has been communicated.

22. The method of claim 21 further comprising measuring at least one quantity related to an energy distribution system, said set of data being generated based on said measuring.

23. In an energy management device, a method of receiving a communication from a network coupled with said energy management device, said method comprising:
   receiving data comprising one of a plurality of portions of an XML document from said network;
   as said data is received, determining when said received one of said plurality of portions comprises processable XML code; and
   when enough data to process has been received, processing said portion to interpret said processable XML code contained therein; and
   repeating said receiving, determining and processing until all of said XML document has been received.

24. The method of claim 23, further comprising:
   controlling said energy management device based on said interpretation of said processable XML code.

25. The method of claim 23, further comprising:
   validating said processable XML code.

26. The method of claim 23, further comprising:
   verifying a well-formedness of said processable XML code.

27. The method of claim 23, wherein said repeating further comprises requesting a next of said plurality of portions.

28. In an energy management device, a method of transmitting a communication from said energy management device over a network coupled with said energy management device, said method comprising:
   means for generating a set of data to be communicated over said network as an XML document;
   means for transforming each of said data into an XML format as it is generated; and
   means for communicating each of said XML formatted data over said network as it is transformed;
   means for purging said XML formatted data from said energy management device as it is communicated; and
   means for repeatedly actuating said means for transforming and said means for communicating until the entire said set of data has been communicated.

29. In an energy management device, a method of receiving a communication from a network coupled with said energy management device, said method comprising:
   means for receiving data comprising one of a plurality of portions of an XML document from said network;
   as said data is received, actuating means for determining when said received one of said plurality of portions comprises processable XML code; and
   when enough data to process has been received, actuating means for processing said portion to interpret said processable XML code contained therein; and
   repeatedly actuating said means for receiving, means for determining and means for processing until all of said XML document has been received.

30. An electrical power management architecture for managing an electrical power distribution system comprising:

a network;

at least one intelligent electronic device (IED) coupled with a portion of said electrical power distribution system and further coupled with said network, each of said at least one IED operative to implement a power management function in conjunction with said portion of said electrical power distribution system, said power management function operative to respond to at least one power management command and generate power management data, each of said at least one IED comprising:

a first network interface operative to couple said at least one IED with said network and facilitate transmission of said power management data and receipt of said at least one power management command over said network; and wherein said first network interface further comprises an incremental XML processor operative to incrementally generate a first XML document based on said power management data for transmission over said network and receive a second incrementally generated XML document comprising said at least one power management command and interpret said second incrementally generated XML document to extract said at least one power management command;

said architecture further comprising:

a power management application coupled with said network and operative to receive and process said first incrementally generated XML document comprising said power management data from said at least one IED and incrementally generate said second XML document comprising said at least one power management command to said at least one IED to implement said power management function.

31. An energy meter for managing the flow of electrical energy in an electrical distribution system, said energy meter for use in an energy management architecture for managing said electrical distribution system, said energy management architecture comprising a network, said energy meter comprising:

a network interface operative to couple said energy meter with said network;

an electrical distribution system interface operative to couple said energy meter with said electrical distribution system, said energy meter further operative to measure at least one quantity of said electrical distribution system via said electrical distribution system interface;

a processor coupled with said network interface and said electrical distribution system interface and operative to process said at least one quantity to manage the flow of electrical energy, and further operative to generate one of a power management command and power management data related thereto; and wherein said network interface is further operative to receive said one of a power management command and power management data from said processor, incrementally generate an XML document comprising said one of a power management command and power management data, said XML document being generated as a plurality of segments, wherein each of said plurality of segments is communicated to said network as it is generated.

* * * * *